(12) United States Patent
Fomani et al.

(10) Patent No.: US 10,796,128 B2
(45) Date of Patent: Oct. 6, 2020

(54) OPTICAL SENSOR WITH AMBIENT LIGHT FILTER

(71) Applicant: FINGERPRINT CARDS AB, Gothenburg (SE)

(72) Inventors: Arash Akhavan Fomani, Saratoga, CA (US); Marek Mienko, San Jose, CA (US); Richard Klenkler, San Jose, CA (US); Patrick Smith, San Jose, CA (US); Robert J. Gove, Los Gatos, CA (US); Guozhong Shen, San Jose, CA (US); Alvin Jee, San Jose, CA (US); Young Seen Lee, Newark, CA (US); Jason Goodelle, San Jose, CA (US); Bob Lee Mackey, San Jose, CA (US)

(73) Assignee: FINGERPRINT CARDS AB, Gothenburg (SE)

( * ) Notice: Subject to any disclaimer, the term of this patent is extended or adjusted under 35 U.S.C. 154(b) by 0 days.

(21) Appl. No.: 16/218,284

(22) Filed: Dec. 12, 2018

(65) Prior Publication Data
US 2019/0180072 A1     Jun. 13, 2019

Related U.S. Application Data

(60) Provisional application No. 62/597,925, filed on Dec. 12, 2017.

(51) Int. Cl.
*G06K 9/00* (2006.01)
*G02B 6/42* (2006.01)

(52) U.S. Cl.
CPC ....... *G06K 9/0004* (2013.01); *G06K 9/00046* (2013.01); *G02B 6/42* (2013.01); *G06K 2009/0006* (2013.01)

(58) Field of Classification Search
None
See application file for complete search history.

(56) References Cited

U.S. PATENT DOCUMENTS

| 4,785,171 A | 11/1988 | Dowling, Jr. et al. |
| 5,726,443 A | 3/1998 | Immega et al. |
| 5,808,729 A | 9/1998 | Sugawara et al. |
| 2005/0249390 A1 | 11/2005 | McClurg et al. |
| 2007/0252005 A1* | 11/2007 | Konicek ............... G06K 9/0004 235/435 |
| 2008/0191298 A1 | 8/2008 | Lin et al. |
| 2016/0254312 A1* | 9/2016 | Lee ..................... G06K 9/0004 382/125 |
| 2019/0065816 A1* | 2/2019 | Reinhold ............. G02B 6/0061 |

FOREIGN PATENT DOCUMENTS

JP      2011156011 A   *   8/2011

OTHER PUBLICATIONS

English machine translation of Japanese patent publication JP2011-156011 A to Yamashita.*

* cited by examiner

*Primary Examiner* — Nicholas J Lee
(74) *Attorney, Agent, or Firm* — RMCK Law Group, PLC

(57) ABSTRACT

An optical sensor device includes: a display layer, comprising a light source configured to generate light incident on an input surface of the optical sensor device; an image sensor layer, disposed below the display layer, comprising an optical image sensor having a plurality of image sensor pixels; and a first ambient light filter layer, disposed between the display layer and the image sensor layer, configured to block one or more wavelengths of light.

19 Claims, 25 Drawing Sheets

OPTICAL SENSOR WITH AMBIENT LIGHT FILTER

CROSS-REFERENCE TO RELATED APPLICATIONS

This patent application claims the benefit of U.S. Provisional Patent Application No. 62/597,925, filed Dec. 12, 2017, which is incorporated herein by reference in its entirety.

FIELD

Embodiments disclosed herein are related to optical sensors, and more particularly, under display optical fingerprint sensors having ambient light filters.

BACKGROUND

Object imaging is useful in a variety of applications. By way of example, fingerprint recognition systems image fingerprints for authenticating and/or verifying users of devices incorporating the recognition systems. Fingerprint imaging provides a reliable, non-intrusive way to verify individual identity for recognition purposes. Optical sensors are an attractive fingerprint sensing solution because they allow for high resolution capture of small scale fingerprint patterns through thick layers, such as thick layers that protect the displays of many of today's mobile devices or even through the display itself. However, traditional optical fingerprint sensors are bulky and susceptible to a variety of sources of noise that have thus far prevented them from being adopted into many of today's small form factor devices.

SUMMARY

In an exemplary embodiment, an optical sensor device includes: a display layer, comprising a light source configured to generate light incident on an input surface of the optical sensor device; an image sensor layer, disposed below the display layer, comprising an optical image sensor having a plurality of image sensor pixels; and a first ambient light filter layer, disposed between the display layer and the image sensor layer, configured to block one or more wavelengths of light.

In an exemplary embodiment, an optical sensor system includes: an optical sensor having: a display layer, comprising a light source configured to generate light incident on an input surface of the optical sensor device; an image sensor layer, disposed below the display layer, comprising an optical image sensor having a plurality of image sensor pixels; and a first ambient light filter layer, disposed between the display layer and the image sensor layer, configured to block one or more wavelengths of light; and a processing system, configured to image a biometric input at a sensing region of the optical sensor based on light detected by the optical image sensor.

In an exemplary embodiment, a process for providing optical sensors includes: providing a protective layer, wherein the protective layer comprises ambient light filter material; and attaching the protective layer to a sensor wafer; and dividing the sensor wafer into multiple respective optical sensors.

DETAILED DESCRIPTION

Figure 1:
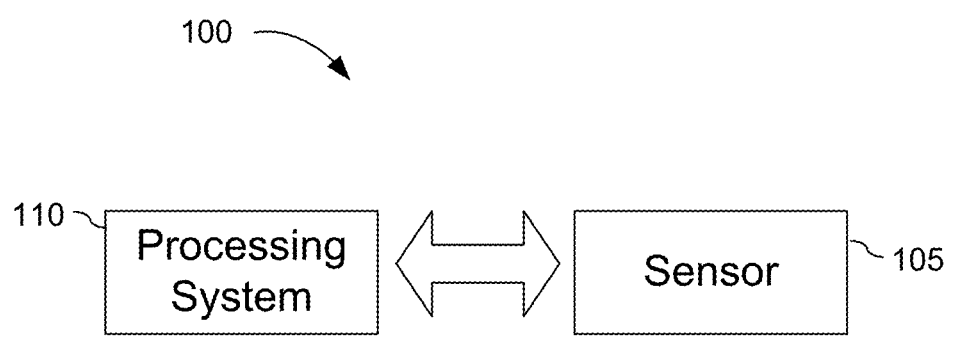
FIG. 1 is a block diagram depicting an exemplary input device.

The following detailed description is exemplary in nature and is not intended to limit the disclosure or the application and uses of the disclosure. Furthermore, there is no intention to be bound by any expressed or implied theory presented in the preceding background, summary, brief description of the drawings, the following detailed description, or the appended abstract.

An issue with respect to the operation of optical sensors is that, under intense ambient light conditions, the intensity of light arriving at the sensor due to ambient light may be significantly higher than the intensity of the desired light signal. For example, in an optical fingerprint sensor the intensity of ambient light passing through a finger and reaching a sensor may be significantly higher than the intensity of light that comes from an illumination source of the sensor device and is reflected from the finger (or finger input surface).

In an example, it has been demonstrated that the ratio of the intensity of ambient light detected by the optical sensor to the intensity of desired light from the illumination source detected by the optical sensor can be as high as ~15× under direct sunlight conditions. Due to the effect of the ambient light, different images captured by the optical sensor may have high variability with respect to the contrast level of the images (e.g., depending on the ambient light intensity and the type of illumination source of the optical sensor), and may require the optical sensor to support a relatively large dynamic range.

Exemplary embodiments provide optical sensors, such as optical fingerprint sensors, having one or more ambient light filters, as well as processes for manufacturing such sensors and assemblies for integrating ambient light filters with under display (or through-display) optical sensors. By including an ambient light filter, ambient light is selectively rejected (e.g., blocked and/or attenuated) from reaching photosensors or image sensor pixels of the optical sensor. This reduces the sensitivity of the optical sensor to ambient light conditions. Further, by positioning an ambient light filter with appropriate spectral characteristics between operational components of a display and optical sensor, the ambient light filter(s) can avoid unduly reducing or corrupting the desired display light signal and/or sensor light signal. Thus, by including an ambient light filter, ambient light may be rejected while maintaining a relatively constant dynamic range for the signal detected by the optical sensor. Although it may be possible to choose an illumination scheme that uses ambient light to increase the contrast of the image for an optical sensor without an ambient light filter, such an approach could result in variable image quality depending on the ambient lighting conditions. In addition, the optical sensor without the ambient light filter may need to have a higher dynamic range or a variable integration time depending on the captured light intensity.

Table I shows the total light intensity arriving at a collimator for exemplary display devices having an optical fingerprint sensor with and without an ambient light filter that rejects wavelengths above 600 nm, which provides an example cut-off point for maintaining the intensity of reflected light from the finger detected by the optical sensor while reducing ambient light transmitted through the finger detected by the optical sensor. In this example, it was demonstrated that for the optical fingerprint sensor with the ambient light filter, the intensity of reflected light from the illumination source (i.e., the reflected light from the display in this example) arriving at the collimator was ~9× brighter than the intensity of ambient light arriving at the collimator. On the other hand, it was demonstrated that for the optical fingerprint sensor without the ambient light filter, the intensity of ambient light arriving at the collimator was ~15× brighter than the intensity of reflected light from the illumination source (i.e., the reflected light from the display) arriving at the collimator.

TABLE I

| | Display Light Intensity (W/m$^2$) | Ambient Light Intensity (W/m$^2$) |
|---|---|---|
| With Filter | 0.010 | 0.0012 |
| Without Filter | 0.021 | 0.319 |

Turning now to the figures, FIG. 1 is a block diagram depicting an exemplary input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth®, radio frequency (RF), and Infrared Data Association (IRDA).

In FIG. 1, the input device 100 includes a sensor device 105. The sensor device 105 comprises one or more sensing elements configured to sense input provided by one or more input objects in a sensing region. Examples of input objects include fingers, styli, and hands. The sensing region encompasses any space above, around, in and/or near the sensor device 105 in which the sensor device 105 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The sensor device 105 comprises one or more sensing elements for detecting user input. Some implementations utilize arrays or other regular or irregular patterns of sensing elements to detect the input object. The sensor device 105 may utilize different combinations of sensor components and sensing technologies to detect user input in the sensing region.

Specifically, the sensor device 105 may utilize optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, phototransistors, and other suitable photosensors sensitive to light in wavelength(s) of interest. By way of example, the photosensors may be formed in a complementary metal-oxide-semiconductor (CMOS), a charge-coupled device (CCD), or a thin-film transistor (TFT) based image sensor. Active illumination may be used to provide light to the sensing region, and reflections from the sensing region in the illumination wavelength(s) may be detected to determine input information corresponding to the input object.

One exemplary optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another exemplary optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. In some embodiments, high contrast signals can be achieved if principles of frustrated total internal reflection (FTIR) are used to detect the input object, where the light is directed to the input surface at an angle of incidence at which it is totally internally reflected, except at locations where the input object is in contact and causes the light to be scattered by the input object or partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

Some implementations of the sensor device 105 are configured to provide images that span one, two, three, or higher dimensional spaces. The sensor device 105 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

In one embodiment, the sensor device 105 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 mm$^2$ or less. In another exemplary embodiment, a partial placement sensor has an imaging area in the range of 20-50 mm$^2$. In some implementations, the partial fingerprint sensor has an input surface that is the same size the imaging area.

In yet further embodiments, the sensor device 105 may be configured for capturing other information, such as sensing other biometrics (e.g., palm prints, hand prints, vein patterns, etc.) or proximity sensing.

The input device 100 also includes a processing system 110. The processing system 110 comprises parts of or all of one or more integrated circuits (ICs) and/or other circuitry components. The processing system 110 is coupled to the sensor device 105, and is configured to detect input in the sensing region using sensing hardware of the sensor device 105.

The processing system 110 may include driver circuitry configured to drive sensing signals with sensing hardware of the input device 100 and/or receiver circuitry configured to receive resulting signals with the sensing hardware. For example, a processing system for an optical sensor device may be configured to drive one or more light-emitting diodes (LEDs) or other light sources, and/or receive resulting signals via optical receiving elements of the sensor device 105.

The processing system 110 may include processor-readable instructions, such as firmware code, software code, and/or the like. The processing system 110 can be implemented as a physical part of the sensor device 105, or can be physically separate from the sensor device 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor device 105 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from sensor elements. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device. The display device may be any suitable type of dynamic display capable of displaying a visual interface to a user, including an inorganic LED display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the sensor device 105, such as using one or more display electrodes for both display updating and input sensing. As another example, the display screen may be operated in part or in total by the processing system 110 in communication with the input device.

Figure 2A:
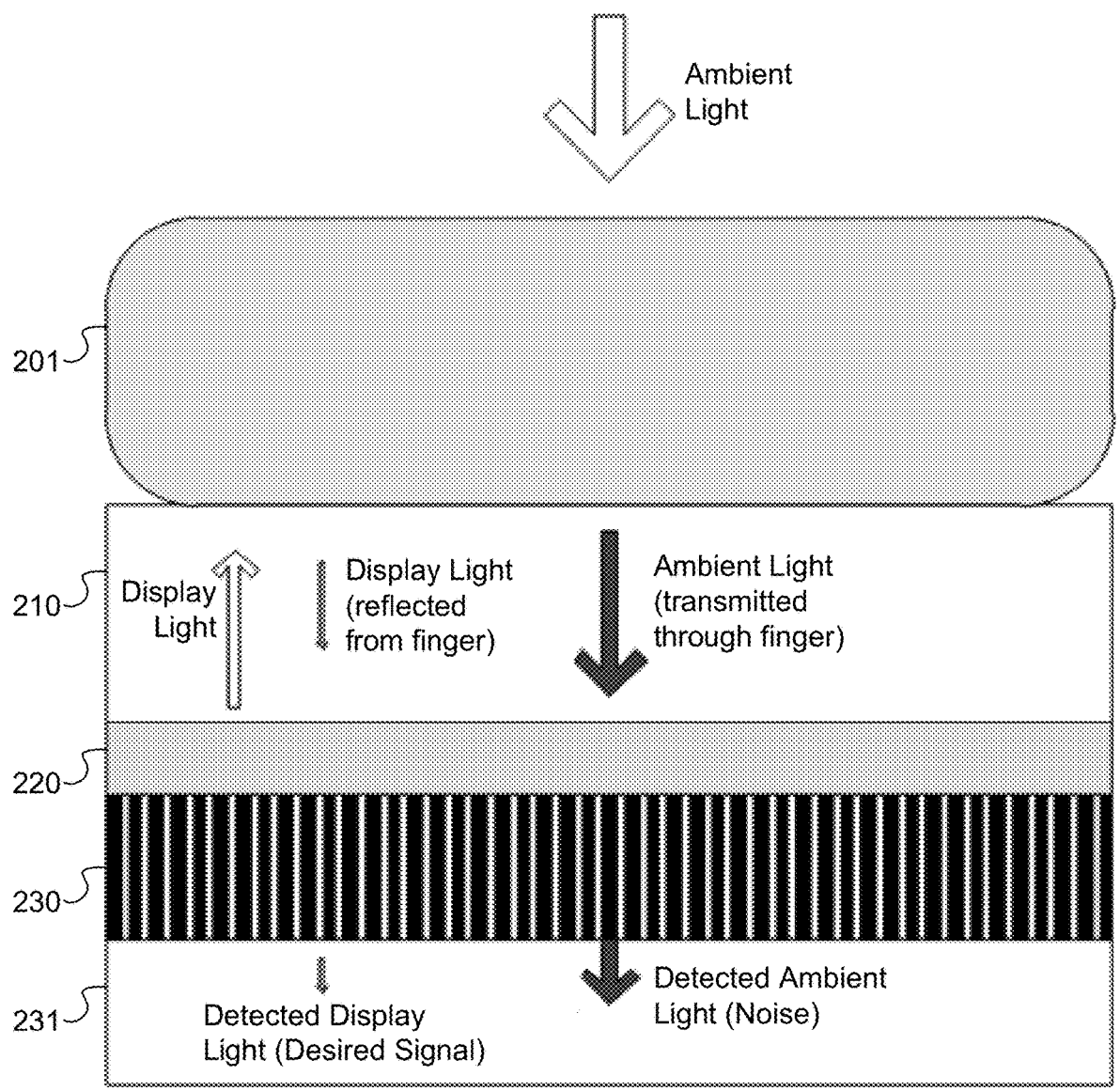
FIG. 2A is a schematic diagram depicting an exemplary optical fingerprint sensor without an ambient light filter.

FIG. 2A is a schematic diagram depicting an exemplary optical fingerprint sensor without an ambient light filter. A biometric object such as finger 201 is placed in a sensing region of the optical fingerprint sensor (e.g., on an input surface of a cover layer 210, which may comprise, for example, a cover glass). Below the cover layer 210 is a display layer 220. The display layer 220 may include display components such as LEDs (e.g., microLEDs, OLEDs, etc.), pixel circuits, and/or a display backplane. In one embodiment, the display layer 220 comprises an organic light emitting diode (OLED) display panel or an emissive display panel having a plurality of light emitting pixels. The display layer 220 may also provide display light as the illumination source for the optical fingerprint sensor (e.g., light from one or more light emitting display pixels or other light emitters included in the display layer 220). It will be appreciated that in other exemplary embodiments, not depicted, an illumination source other than the display layer may be used to provide the light reflected from the finger. Below the display layer 220 is an optical layer (or a conditioning layer) 230. The optical layer 230 may include a light filter or other optical element that acts on light incident on the optical layer 230 to facilitate optical sensing by the optical sensor. In some embodiments, as shown in FIG. 2A, the optical layer 230 may include a collimating element (or elements) which passes a set of light rays falling within an angle of acceptance, but rejects a set of light rays falling outside of the angle of acceptance. Additionally or alternatively, the optical layer 230 may include refractive and/or diffractive optical components, such as microlenses, Fresnel lenses, zone plates, and the like. Below the optical layer 230 is an image sensor layer 231 having a plurality of photosensors. The image sensor layer 231 may include an image sensor die having an array of image sensor pixels, for example, with the pixels being aligned to respective collimating elements of the optical layer 230.

As depicted in FIG. 2A, ambient light is transmitted through the finger 201, through the cover layer 210, through the display layer 220, through the optical layer 230, and arrives at the image sensor layer 231, causing the image sensor pixels (photosensors) to receive noise in the form of detected ambient light. The desired signal from the display light, which originates from display layer 220, is reflected from finger 201, and then passes through optical layer 230, also arrives at the image sensor layer 231. The image sensor pixels detect an image of a fingerprint of the finger 201 based on the detected display light.

Figure 2B:
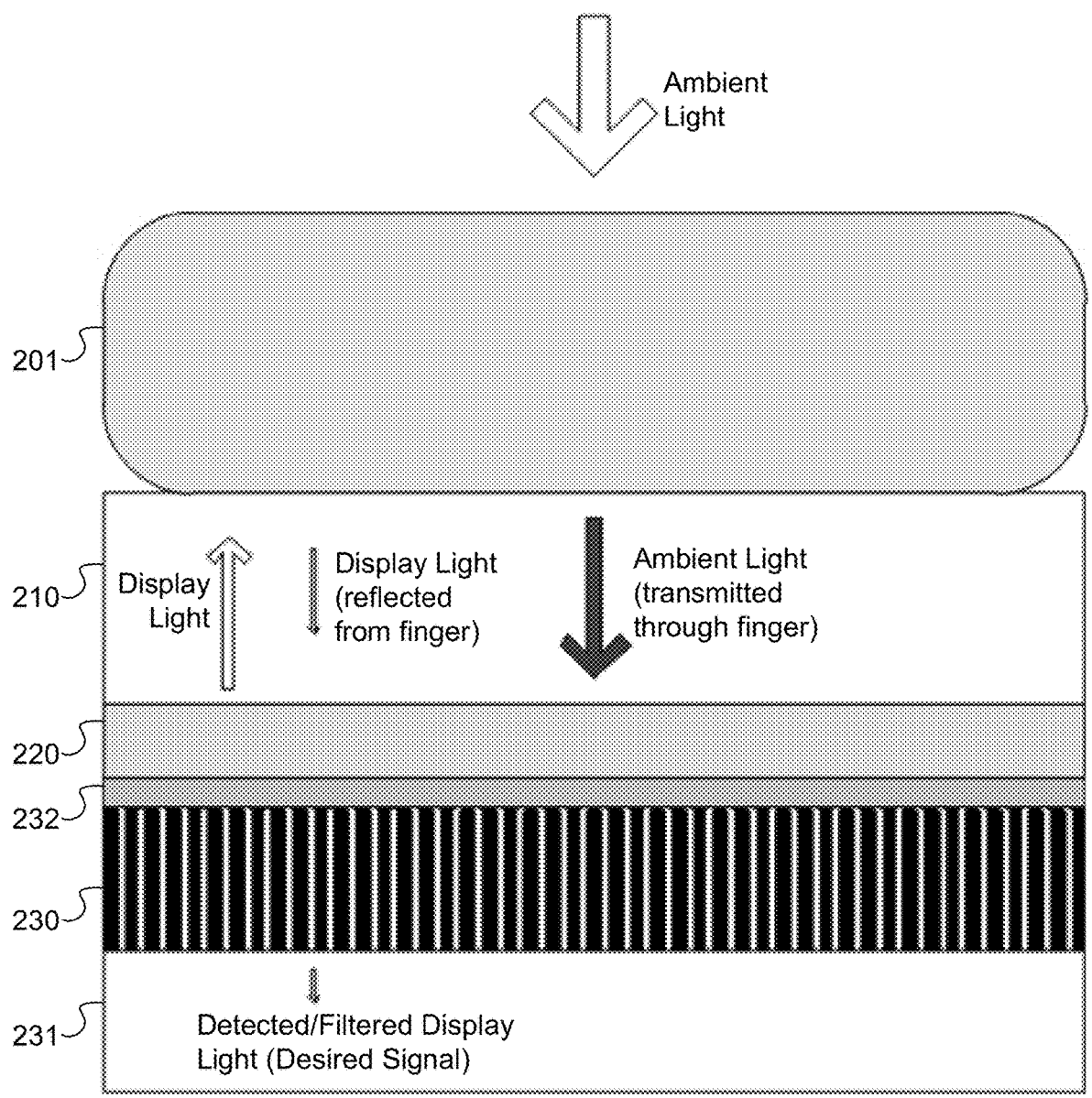
FIGS. 2B-2D are schematic diagrams each depicting an exemplary optical fingerprint sensor with an ambient light filter according to an exemplary embodiment.

FIG. 2B is a schematic diagram depicting an exemplary optical fingerprint sensor with an ambient light filter according to an exemplary embodiment. In FIG. 2B, an ambient light filter 232 is disposed between the display layer 220 and the optical layer 230 to filter the ambient light transmitted through the finger 201 such that the ambient light does not reach the optical layer 230 or the image sensor layer 231. Accordingly, the desired signal from the display light originates from display layer 220, is reflected from finger 201, passes through the ambient light filter 232 and the optical layer 230, and then arrives at the image sensor layer 231, while the ambient light transmitted through the finger 201, through the cover layer 210, and through the display layer 220 is completely or mostly blocked from reaching the optical layer 230 or the image sensor layer 231 by the ambient light filter 232. Since the ambient light filter 232 can be configured to block light that is also emitted by the display layer 220 for displaying graphics (e.g., a visible red wavelength of light), the positioning shown in FIG. 2B allows the ambient light filter 232 to be included without unduly corrupting display graphics.

Figure 2C:
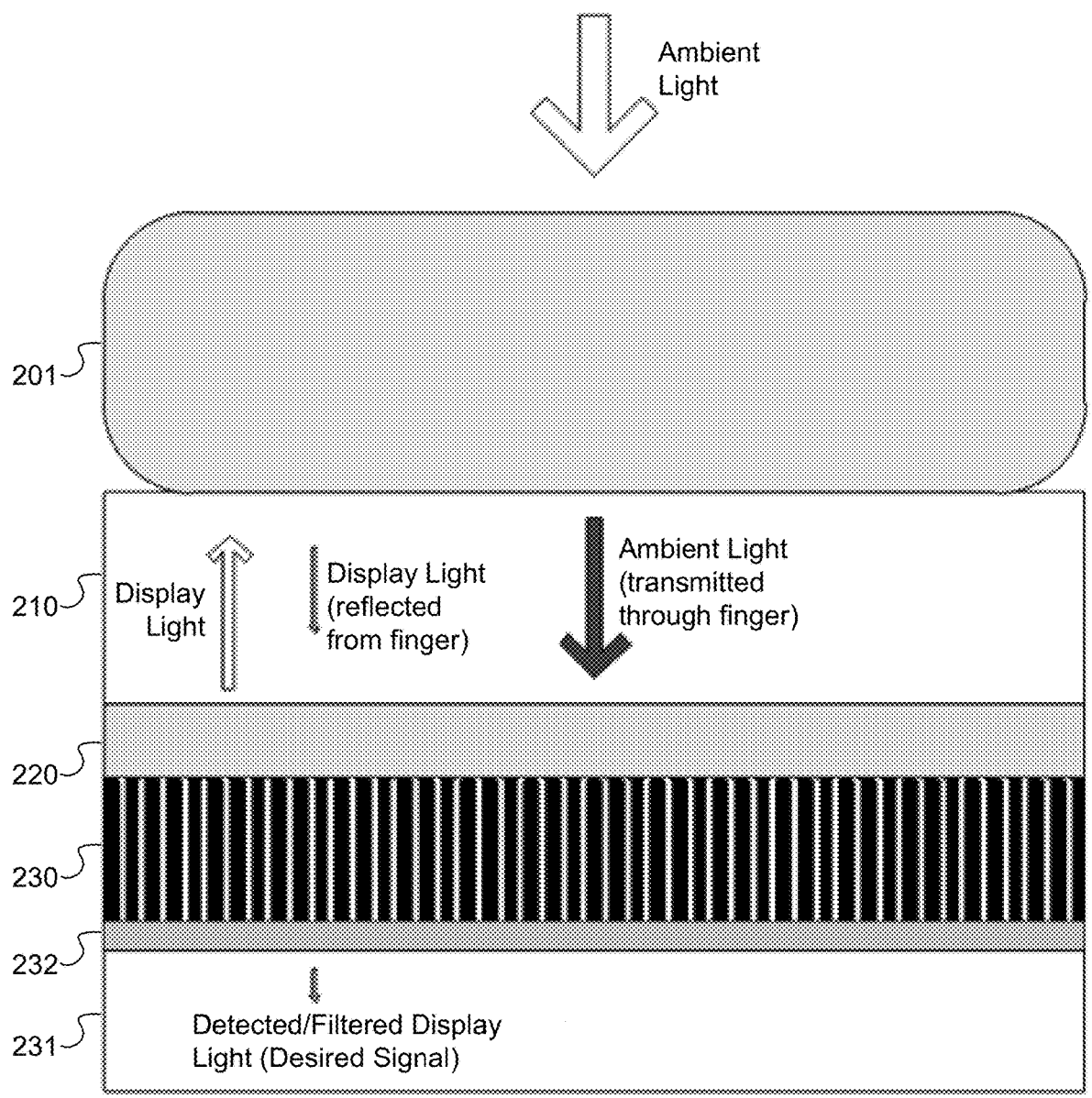

FIG. 2C is a schematic diagram depicting an exemplary optical fingerprint sensor with an ambient light filter according to an exemplary embodiment. In FIG. 2C, an ambient light filter 232 is disposed between the optical layer 230 and the image sensor layer 231 to filter the ambient light transmitted through the finger 201 such that the ambient light does not reach the image sensor layer 231. Accordingly, the desired signal from the display light originates from display layer 220, is reflected from finger 201, passes through the conditioning layer 230 and the ambient light filter 232, and arrives at the image sensor layer 231, while the ambient light transmitted through the finger 201, through the cover layer 210, through the display layer 220 and through the optical layer 230, is completely or mostly blocked from reaching the image sensor layer 231 by the ambient light filter 232.

Figure 2D:
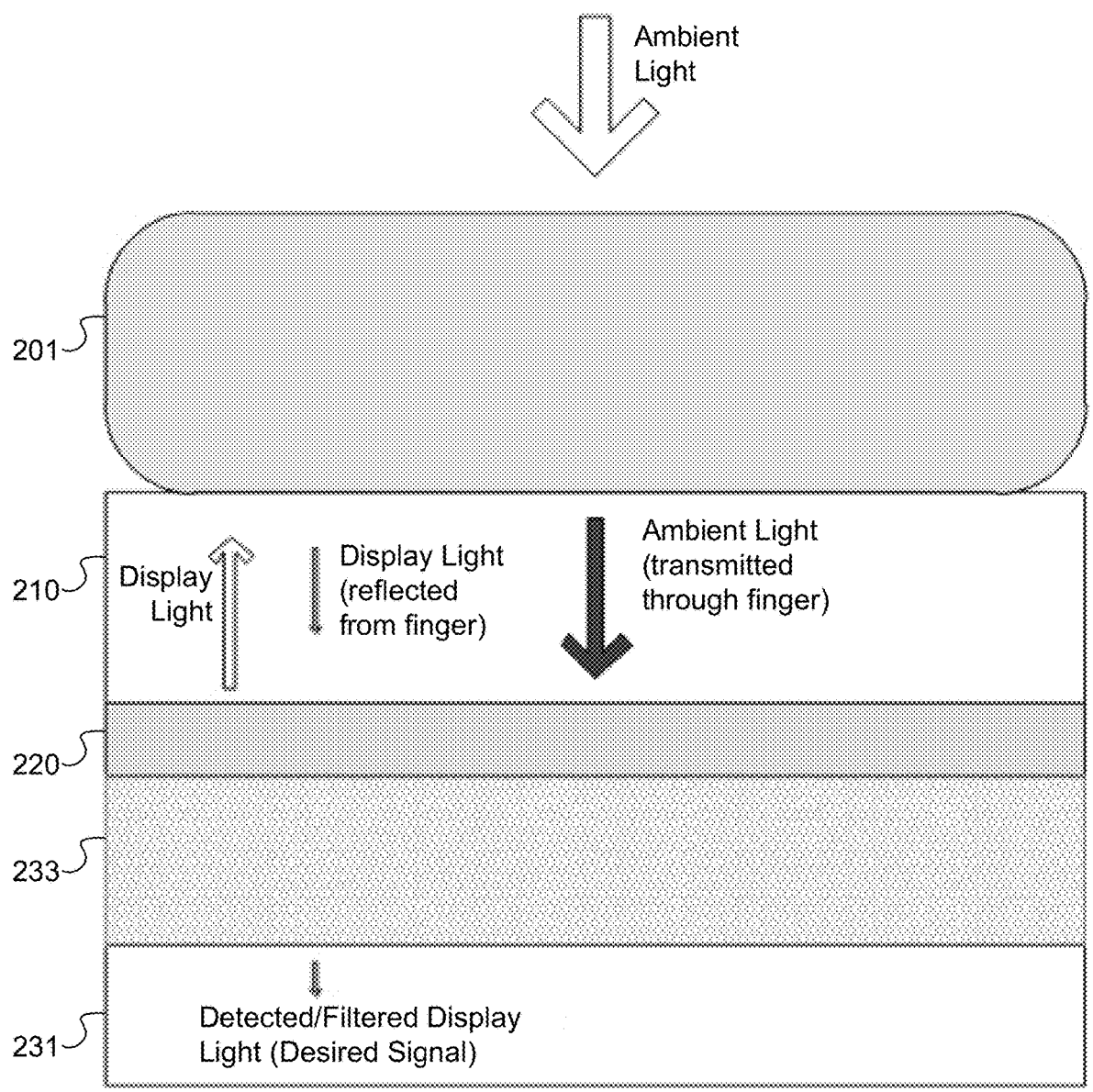

FIG. 2D is a schematic diagram depicting an exemplary optical fingerprint sensor with an ambient light filter according to an exemplary embodiment. In FIG. 2D, an ambient light filter is integrated with an optical layer so as to provide a hybrid optical and ambient filter layer 233. The hybrid optical and ambient filter layer 233 may both collimate light passing through the hybrid optical and ambient filter layer 233 and filter ambient light transmitted through the finger 201 such that the ambient light does not reach the image sensor layer 231. Accordingly, the desired signal from the display light, which originates from display layer 220, is reflected from finger 201, passes through the hybrid optical and ambient filter layer 233, and arrives at the image sensor layer 231, while the ambient light transmitted through the finger 201, through the cover layer 210, and through the display layer 220 is completely or mostly blocked from reaching the image sensor layer 231 by the hybrid optical and ambient filter layer 233.

Figure 3A:
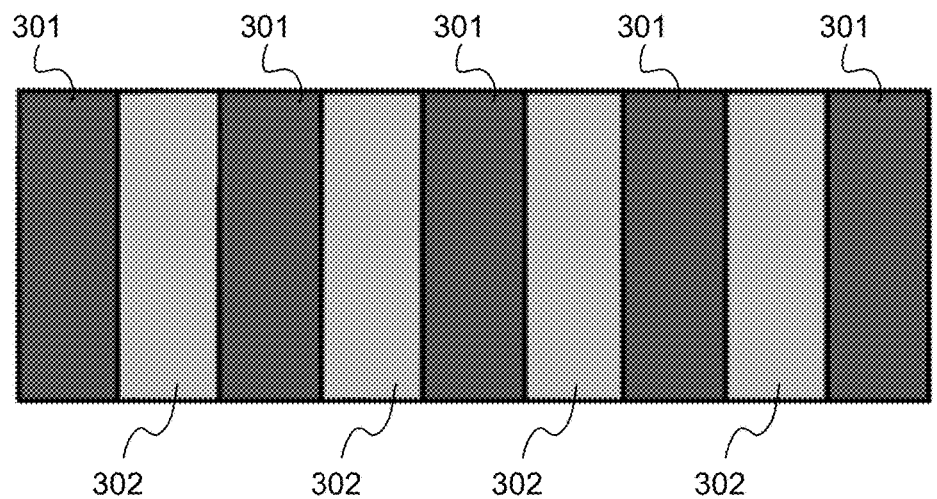
FIGS. 3A-3C are schematic diagrams depicting exemplary hybrid collimator/filter layers according to exemplary embodiments.
Figure 3B:
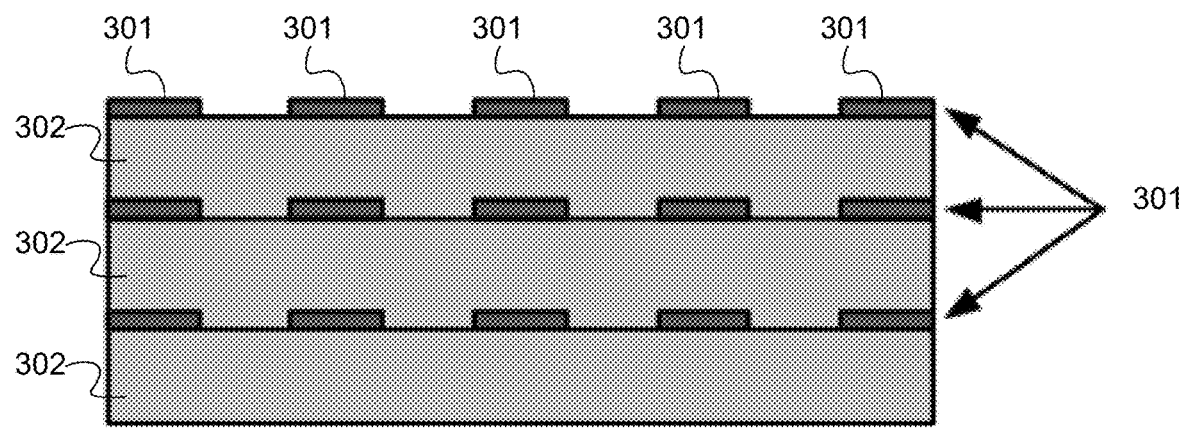
Figure 3C:
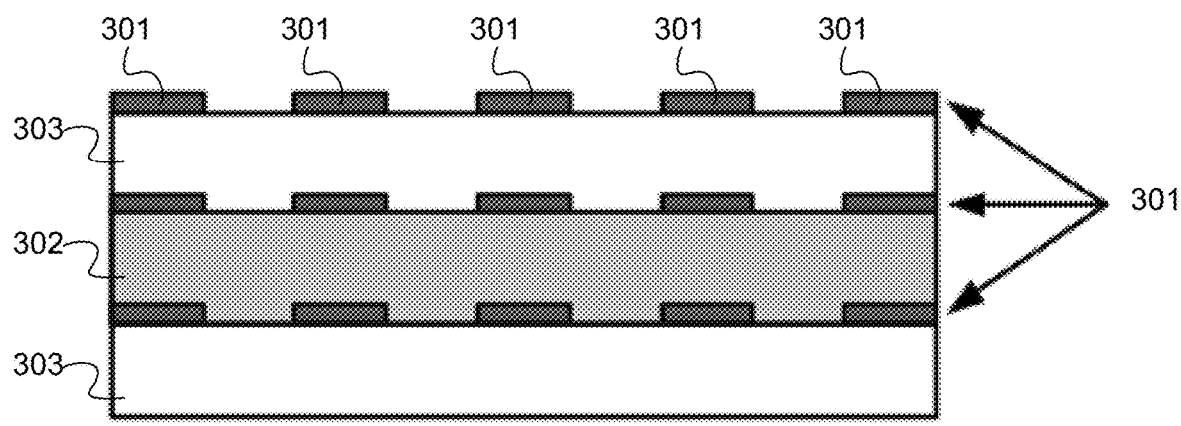

FIGS. 3A-3C are schematic diagrams depicting exemplary hybrid optical and ambient filter layers according to exemplary embodiments.

FIG. 3A depicts a hybrid optical and ambient filter layer having a plurality of light collimating apertures with vertically extending light blocking structures 301. Between the vertically extending light-blocking structures 301 are light-transmitting regions 302. The light-transmitting regions 302 may be configured as a spectral filter, allowing light of certain wavelengths to pass through while blocking light of other wavelengths. In particular, the light transmitting regions 302 may transmit light in a set of wavelengths of interest while blocking ambient light in set of wavelengths other than the wavelengths of interest. The light blocking structures 301 may be configured to block the wavelengths of interest, which can provide a light collimating effect that blocks light from passing through from undesired angles. In some embodiments, the wavelengths of interest include one or more visible green and/or blue wavelengths of light, while the ambient light other than the wavelengths of interest include one or more visible red and/or infrared wavelengths of light. In some embodiments, the light blocking structures 301 include an opaque material, such as black material.

FIG. 3B depicts a hybrid optical and ambient filter layer having a collimator array with multilayer blocking structures 301. Between the multilayer light-blocking structures 301 are light-transmitting regions 302. The light-transmitting regions 302 may be configured as a spectral filter, allowing light of certain wavelengths to pass through while blocking light of other wavelengths. The light blocking structures 301 may be configured to block light incident from undesired angles, such that the hybrid optical and ambient filter layer acts as a collimator array. The hybrid optical and ambient filter layer shown in FIG. 3B may be similar to that shown in FIG. 3A, except that the vertical light transmitting regions are formed collectively through a series of alternating transparent layers and thin light blocking layers instead through thicker vertically extending light blocking materials.

FIG. 3C depicts a hybrid optical and ambient filter layer having a collimator array with multilayer light blocking structures 301. Between the multilayer light-blocking structures 301 are light-transmitting regions 302 and light-transmitting regions 303. The light-transmitting regions 302 may be configured as a spectral filter, allowing light of certain wavelengths to pass through while blocking light of other wavelengths. The light-transmitting regions 303 may be transparent or clear layers not configured as a spectral filter. The light blocking structures 301 may be configured to block light incident at undesired directions, such that the hybrid optical and ambient filter layer acts as a collimator array. The hybrid optical and ambient filter layer shown in FIG. 3C may be similar to that shown in FIG. 3B, except that not all of the transparent layers in the stack are configured as spectral filters.

Figure 3D:
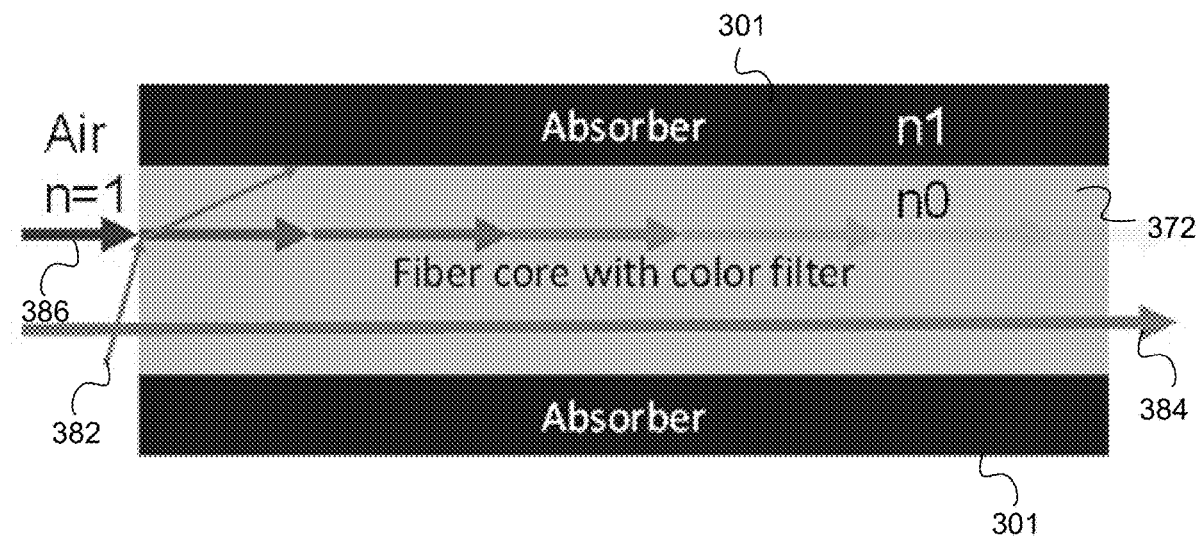
FIGS. 3D-3E depict a hybrid optical and ambient filter layer having an optical fiber collimator with light-blocking structures.
Figure 3E:
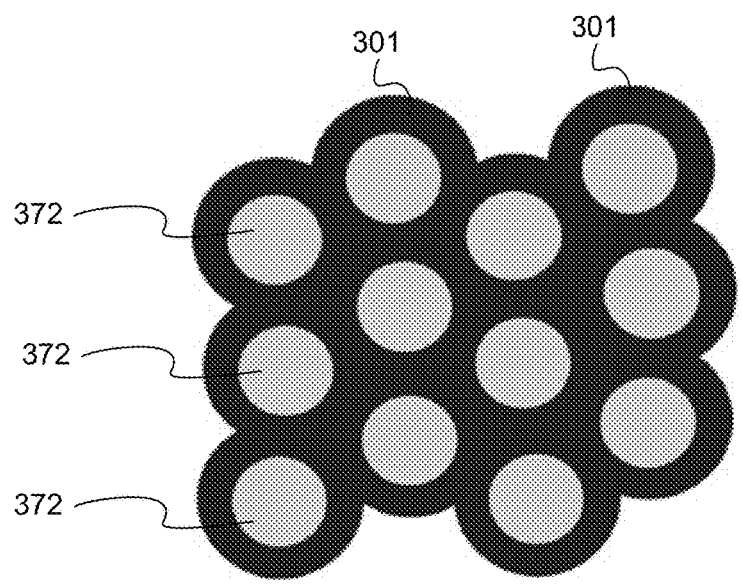

FIGS. 3D-3E depict a hybrid optical and ambient filter layer having an optical fiber collimator with light-blocking structures 301. FIG. 3D shows a cross section view of a single fiber and FIG. 3E shows a top view of a bundle of fibers similar to the fiber shown in FIG. 3D. The fiber shown in FIG. 3D includes a glass fiber core 372 surrounded by an absorptive material 301. The fiber may be constructed similar to a traditional optical fiber having a core and cladding layer; however, the optical fiber collimator includes an absorptive layer 301 made of a light absorbing material (e.g., a black or dark colored material) with a refractive index that can be the same or similar to that of the fiber core 372 instead of an ordinary cladding (e.g., n0=n1, wherein n0 is refractive index of absorber 301 and n1 is refractive index of fiber core 372). In addition, the fiber core 372 may be made of a color filter glass (e.g., a glass fiber with colorant added), providing an ambient light filter in the core region. In some embodiments, the absorber 301 and core 372 may be made of the same base material (e.g., glass), but with different absorptive properties.

FIG. 3D also shows some example light rays interacting with the hybrid optical and ambient filter fiber. The fiber core 372 is transmissive to the wavelength of light ray 382 and light ray 384, but blocks or attenuates the wavelength of light ray 386. The attenuated light ray 386 may be in an infrared or visible red spectrum while the light rays 382 and 384 may be in a green spectrum, for example. Light rays 384 and 386 are parallel to an axis of the fiber, while light ray 382 is substantially off-axis and outside of an angle of acceptance of the fiber. Only light ray 384 out of the three light rays shown is transmitted through the fiber. While the fiber core is transmissive to the wavelength of light ray 382, this light ray is rejected by the absorber 301 because of its entrance angle. While the absorber 301 does not block light rays parallel to the axis of the fiber, parallel light ray 386 is rejected by the fiber because its wavelength is attenuated or blocked by the fiber core 372.

It will be appreciated that using an optical fiber, or bundle of optical fibers, with a color filter core similar to that shown in FIGS. 3D-3E may have benefits for other applications besides fingerprint sensing and light collimation. For example, other optical fiber cables or fiber optic plate applications (e.g., non-fingerprint or non-biometric sensing applications) involving a traditional lower index cladding for spatially confining the light based on total internal reflection may utilize a color filter core to filter light of certain wavelengths for other purposes other than ambient light rejection.

It will also be appreciated that the hybrid optical and ambient filter layers depicted in FIGS. 3A-3E are merely exemplary, and that an ambient filter may be integrated with other types of collimating or light-conditioning structures as well.

It will be appreciated that exemplary ambient light filters disclosed herein can be spectral filters (or wavelength selective filters) that may be implemented as absorptive and/or interference filters. Interference filters are a type of spectral filter that include multiple thin layers of dielectric material having different refractive indices. Parameters of the interference filter (e.g., thicknesses of layers, refractive indices of layers, number of layers, sequence of layers, etc.) may be selected to provide the desired spectral characteristics based on interference effects that occur due to reflections at the interfaces between different layers. By contrast, absorptive filters may filter out light based on principles of light absorption rather than reflections or interference. An absorptive filter may include, for example, a glass or resin layer having compounds or dyes added for absorbing certain wavelengths light.

In some embodiments, interference filters may provide more precise control of the transmission curve compared to an absorptive filter. For example, an interference filter may provide a transmission curve with a relatively sharp cut-off at the desired wavelengths (e.g., sharp cut-off at 580 nm, where the transmission transitions very sharply from strong transmission at wavelengths below 580 nm to strong rejection at wavelengths above 580 nm). This precise control may be desirable for improving SNR in an optical fingerprint sensor disposed below a display layer, as the amount of useful light (e.g., reflected display light) may be limited. In this environment, precise control of the transmission characteristics of the ambient filter can allow optimized rejection of unwanted light and capture of the desired useful signal.

Figure 4:
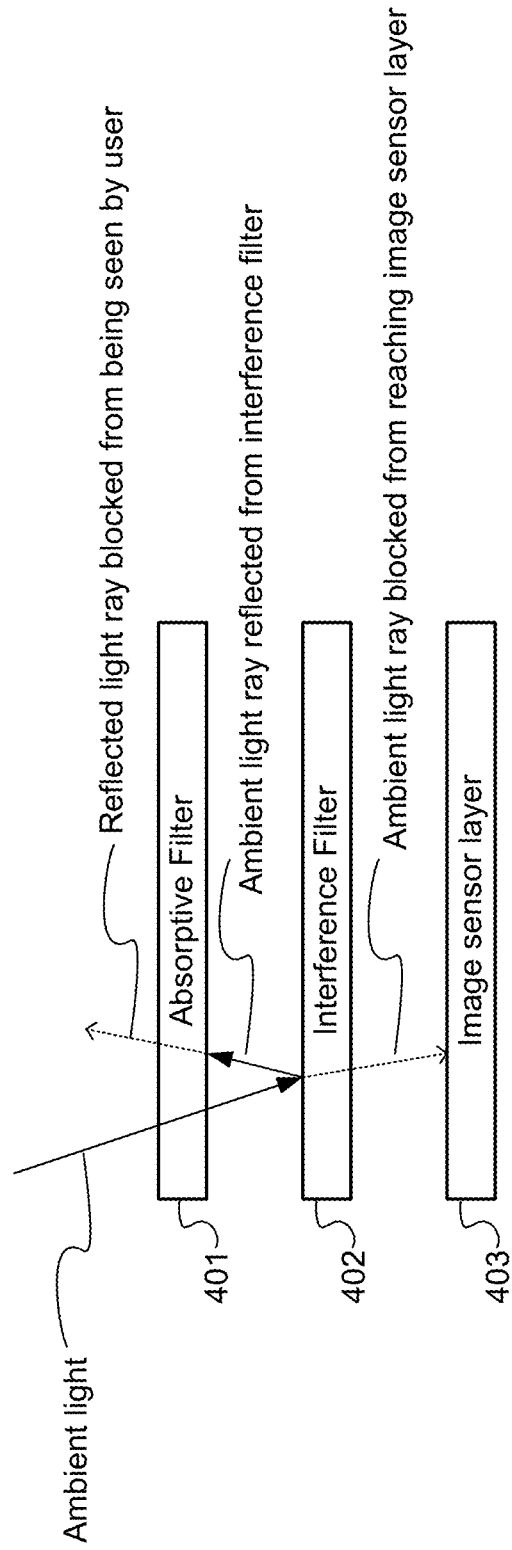
FIG. 4 is a schematic diagram depicting an exemplary ambient light filter according to an exemplary embodiment.

In some embodiments, the ambient light filter may include an absorptive filter disposed above an interference filter, or an absorptive filter disposed at and/or below a display layer and above an interference filter. This is shown schematically in FIG. 4. The absorptive filter 401 may be complementary to wavelengths of light rejected by the interference filter 402. For example, the interference filter 402 may reject at least a portion of the visible red spectrum (such as above 580 nm, or some other cutoff) from reaching the image sensor layer 403, while the absorptive filter 401 may absorb light within the portion of the visible red spectrum, and thereby reduce the visibility of red reflections coming from the interference 402 filter accordingly. Additionally or alternatively, some embodiments may utilize an interference filter 402 patterned and/or positioned in such a way that minimizes the visibility of reflections coming from the interference filter 402.

Figure 5A:
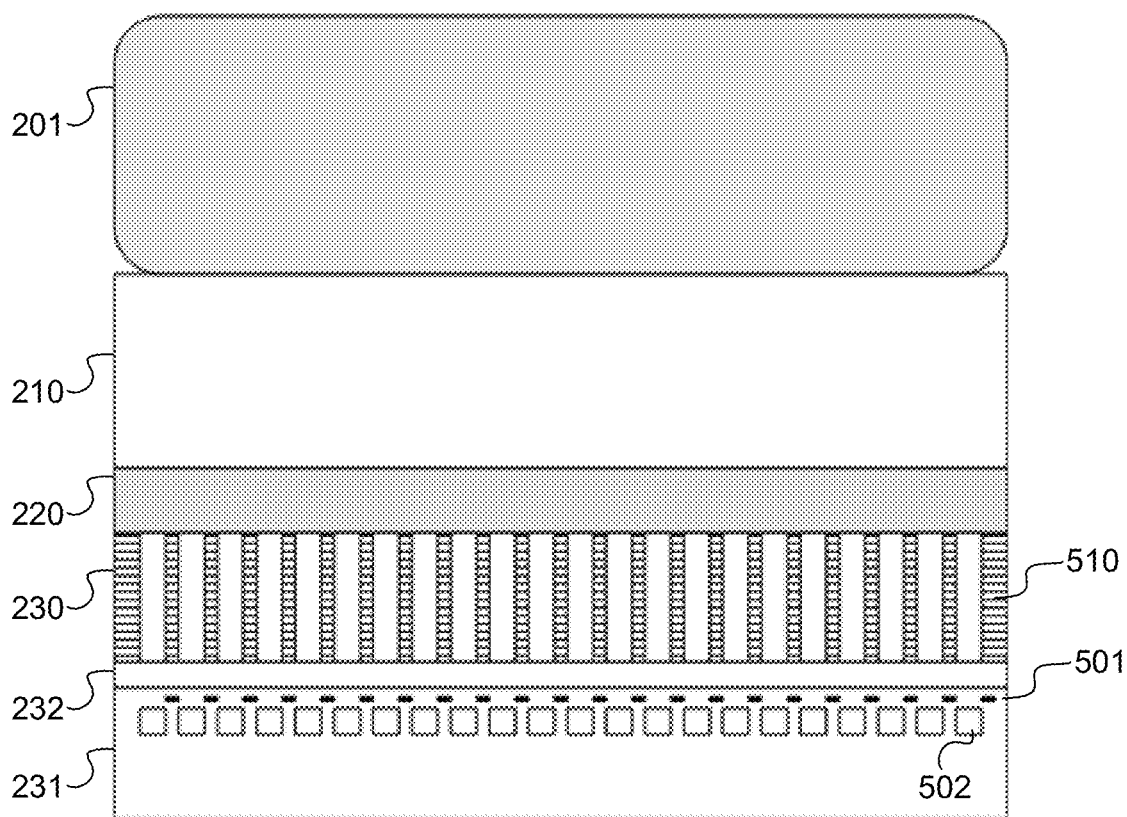
FIG. 5A is a schematic diagram depicting an exemplary optical fingerprint sensor having an ambient light filter according to an exemplary embodiment.
Figure 5B:
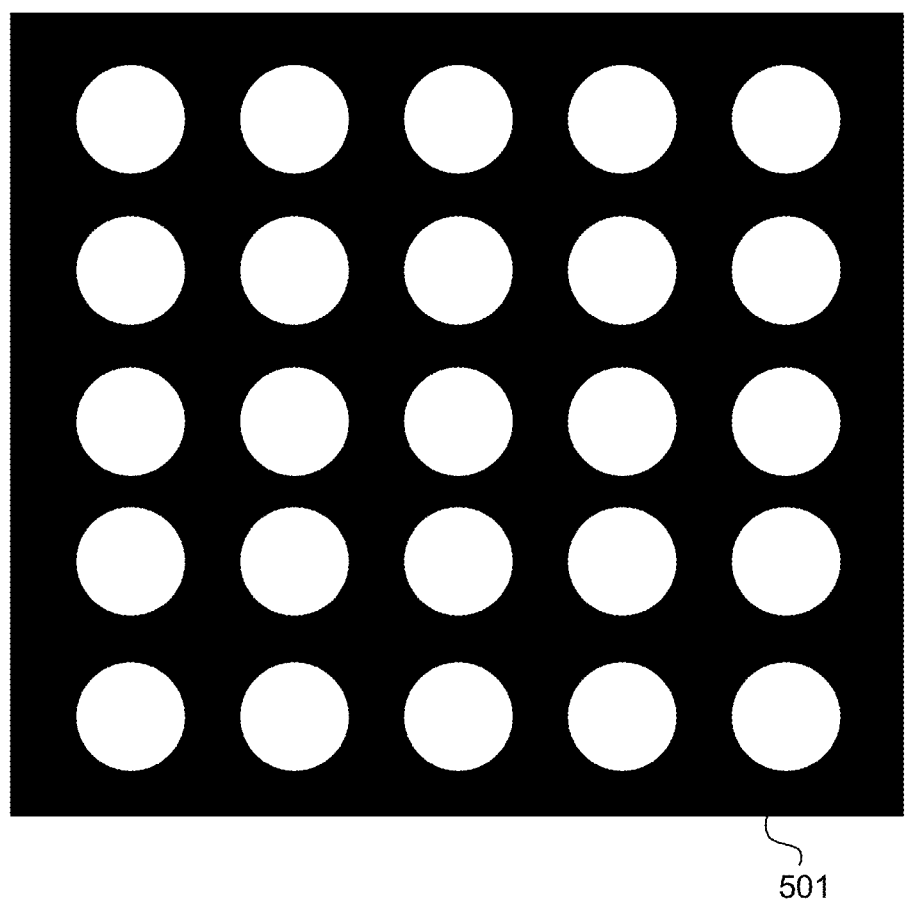
FIG. 5B is a schematic diagram depicting a top view of an image sensor mask.

FIG. 5A is a schematic diagram depicting an exemplary optical fingerprint sensor having an ambient light filter according to an exemplary embodiment. FIG. 5A depicts an ambient light filter 232 disposed between an optical layer 230 and an image sensor layer 231 to filter the ambient light transmitted through the finger such that the ambient light does not reach the image sensor layer 231. FIG. 5A further depicts an image sensor mask 501 disposed above image sensor photodiodes 502 in the image sensor layer 231, and light-blocking structures 510 forming collimating regions in the optical layer 230. The image sensor mask 501 included in an upper layer of the image sensor layer 231 may minimize blurring due to the gap between the bottom of the conditioning layer 230 and the image sensor photodiodes 502. In some exemplary implementations, the image sensor mask 501 is formed in a top metal layer of a silicon die, while other metal layers of the silicon die and/or other metal traces in the top metal layer are used for image sensor wiring and other purposes. FIG. 5B is a schematic diagram depicting a top view of the image sensor mask 501. The apertures in the image sensor mask 501 are aligned to the image sensor photodiodes 502.

It will be appreciated that although the image sensor mask 501 is depicted in FIG. 5A as being incorporated in an exemplary optical fingerprint sensor having an ambient light filter 232 disposed between an optical layer 230 and an image sensor layer 231, in other exemplary embodiments, an image sensor mask may similarly be incorporated into other configurations of optical fingerprint sensors to improve optical performance, such as utilizing an image sensor mask in an exemplary optical fingerprint sensor having an ambient light filter disposed between a display layer and a conditioning layer, or in an exemplary optical fingerprint sensor having an ambient light filter integrated with an optical layer.

Figure 6:
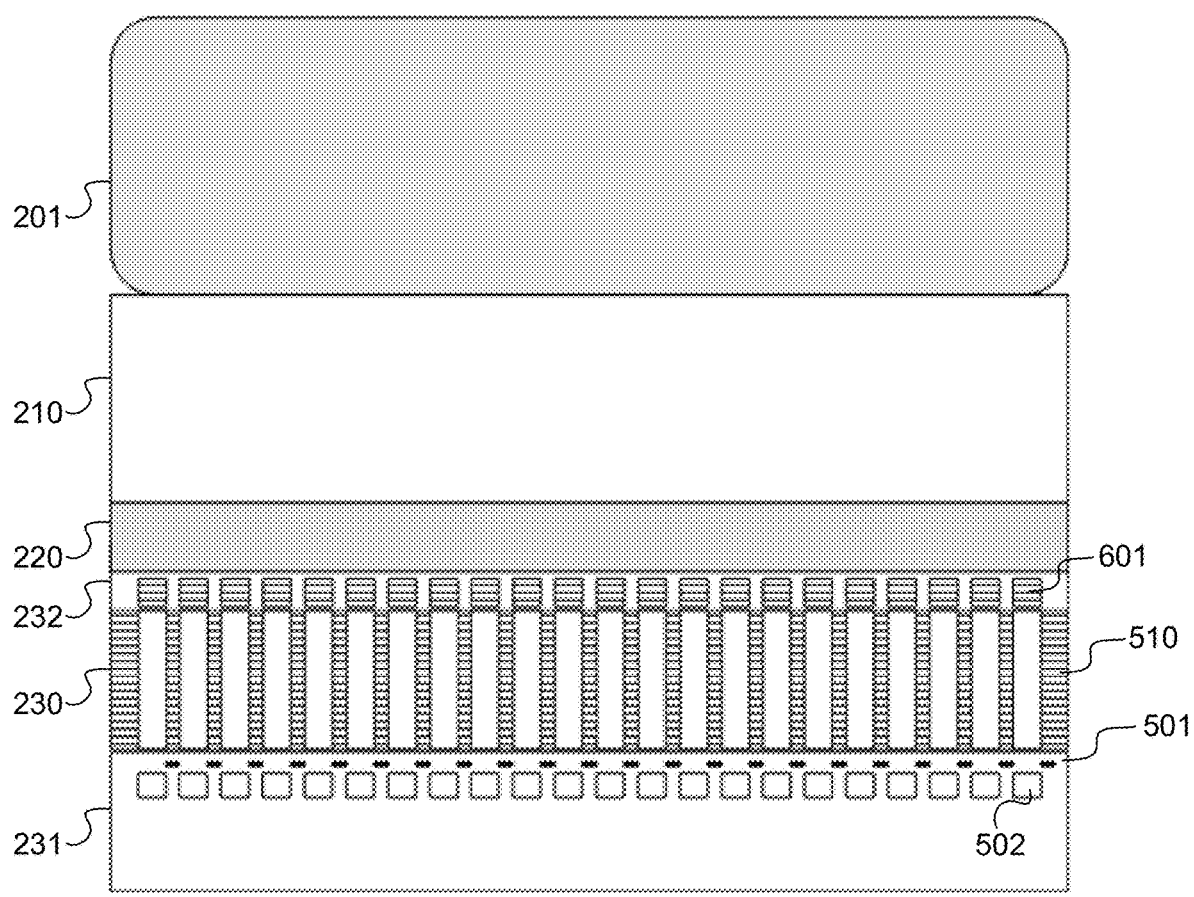
FIG. 6 is a schematic diagram depicting an exemplary optical fingerprint sensor having an ambient light filter according to an exemplary embodiment.

FIG. 6 is a schematic diagram depicting an exemplary optical fingerprint sensor having an ambient light filter according to an exemplary embodiment. FIG. 6 depicts an ambient light filter 232 disposed between a display layer 220 and an optical layer 230 to filter the ambient light transmitted through the finger such that the ambient light does not reach the optical layer 230 or the image sensor layer 231. FIG. 6 is further depicts an image sensor mask 501 disposed above image sensor photodiodes 502 in the image sensor layer 231, and light-blocking structures 510 forming collimating regions in the optical layer 230. Further, FIG. 6 depicts that the ambient light filter 232 is patterned such that the ambient light filtering regions 601 of the ambient light filter 232 correspond to apertures in the optical layer 230 and/or the image sensor photodiodes 502.

Limiting the ambient light filtering regions 601 such that they only correspond to the apertures may reduce visibility of an interference ambient light filter to a user, particularly when the interference ambient light filter is disposed above an optical layer and its visibility is not otherwise blocked by the optical layer. However, it will be appreciated that, in other exemplary embodiments, patterned ambient light filtering regions may similarly be incorporated into other configurations of optical fingerprint sensors, such as in an exemplary optical fingerprint sensor having an ambient light filter disposed between a conditioning layer and an image sensor layer.

In a further exemplary embodiment, the ambient light filter may be included as one or more of the adhesives attaching components of the optical fingerprint sensor to one another, such as in an optically clear adhesive (OCA) or optically clear resin (OCR) layer. The adhesive may have a dye additive configured to absorb selected wavelengths so as to form an absorptive filter. Other materials, such as polymers, may also have wavelength-selective dyes added to form absorptive filters.

In a further exemplary embodiment, the ambient light filter may be a part of the display layer (e.g., part of a display mechanical support stack).

In a further exemplary embodiment, the ambient light filter may be incorporated as part of an image sensor layer (e.g., within the image sensor die). In an exemplary implementation, a thin color filter may be integrated into the image sensor layer to reduce costs. In certain exemplary implementations, the image sensor may be a top-viewing or bottom-viewing TFT sensor that has a glass or other transparent substrate. The bottom-view or "reverse-view" configuration may have an ambient light filter integrated on an opposite side of the glass or transparent substrate.

In further exemplary embodiments, multiple ambient light filters may be included in an optical fingerprint sensor—e.g., a first ambient light filter for rejecting certain wavelengths of non-visible light (e.g., infrared wavelengths) and a second ambient light filter for rejecting visible light. In one example, the first ambient light filter for rejecting non-visible light may be integrated in the cover layer while the second ambient light filter for rejecting visible light is integrated in the conditioning layer (e.g., as depicted above with respect to FIGS. 2D, 3A-3C). In another example, the first ambient light filter for rejecting non-visible light may be integrated in the cover layer while the second ambient light filter for rejecting visible light is integrated in the image sensor layer.

FIGS. 7A-7D are exemplary plots illustrating working principles of exemplary embodiments.

Figure 7A:
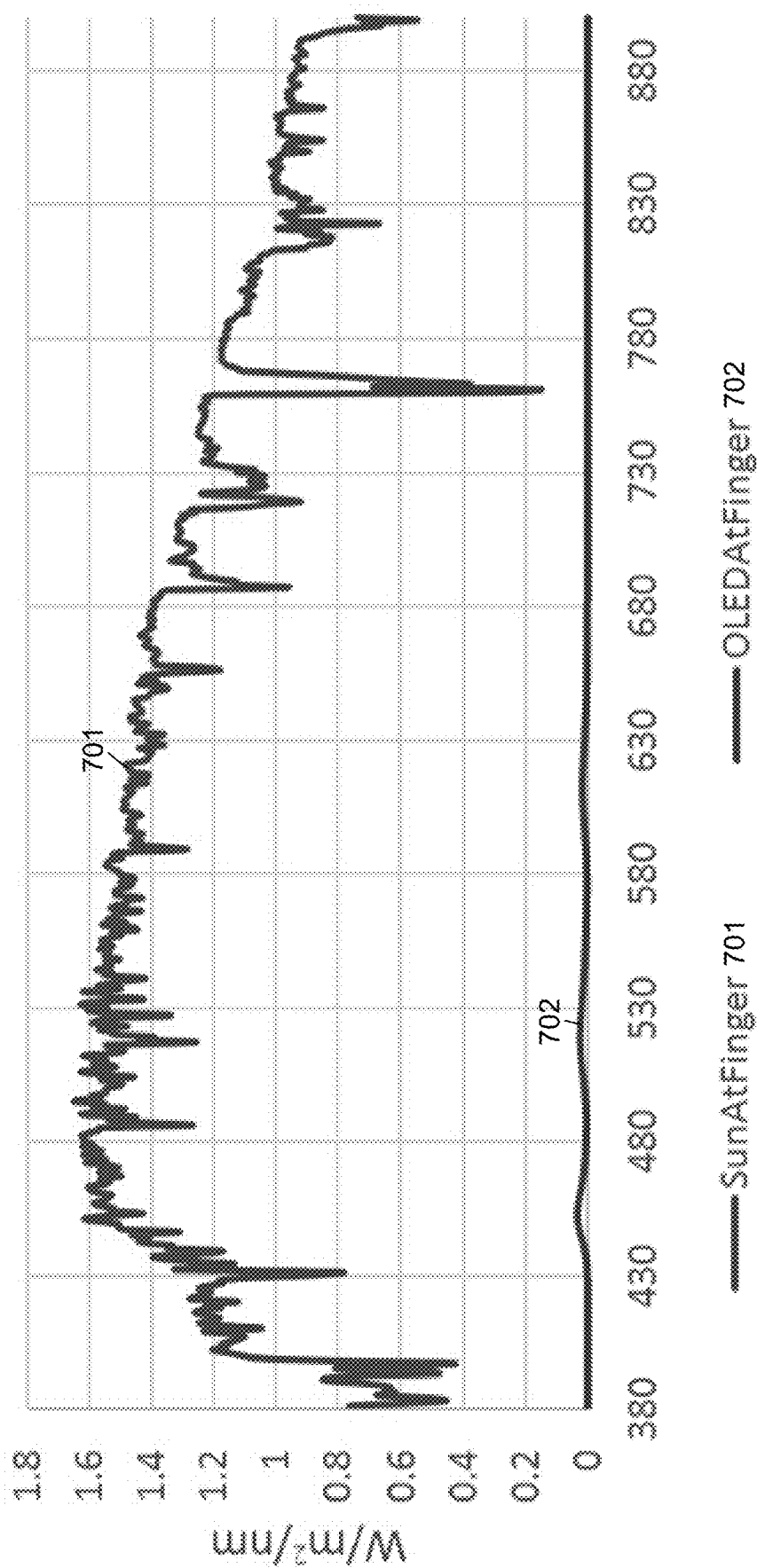
FIGS. 7A-7D are exemplary plots illustrating working principles of exemplary embodiments.

FIG. 7A is a plot depicting the intensity of display light 702 (from an OLED illumination source) and ambient light 701 (under direct sunlight conditions of ~1000 W/m2 or 125000 lx) across a spectrum of wavelengths (380-900 nm) illuminating a finger for an exemplary optical fingerprint sensor. As illustrated, the intensity of the display light at the finger is extremely low relative to the intensity of the ambient light illuminating the finger under direct sunlight conditions across the spectrum. Thus, ambient light that reaches the image sensor of the optical fingerprint sensor can degrade the quality of the image captured by the optical fingerprint sensor.

Figure 7B:
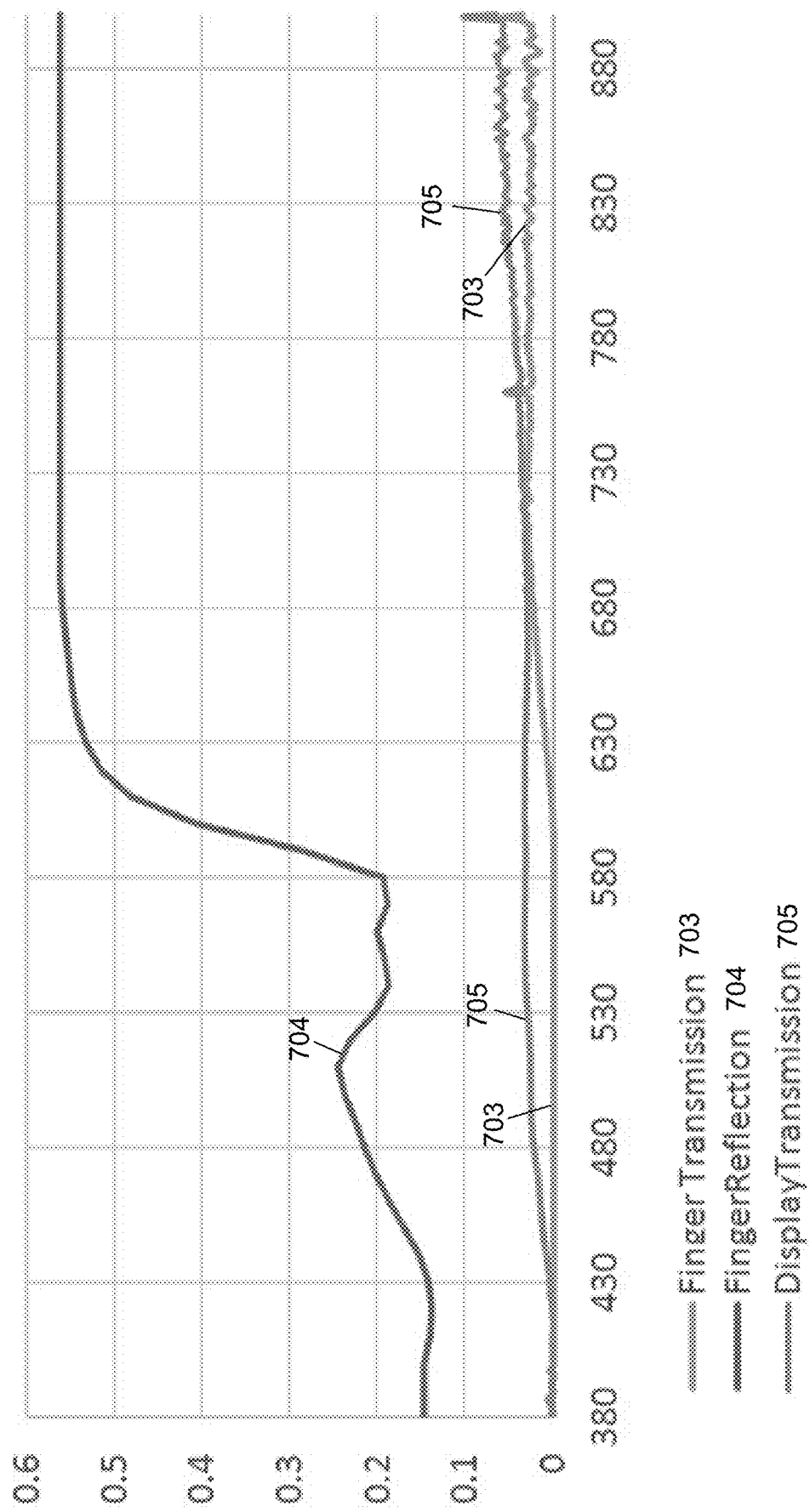

FIG. 7B is a plot depicting finger reflection coefficients 704, finger transmission coefficients 703, and display transmission coefficients 705 for different wavelengths across a spectrum of wavelengths (approximately 380-900 nm). Thus, it will be appreciated that because the finger transmission coefficients 703 are low for wavelengths of below 600 nm, exemplary embodiments may utilize an ambient light filter that blocks wavelengths of 600 nm or more because the wavelengths at which ambient light transmission is greatest is at approximately wavelengths of 600 nm or more. It will be appreciated that this may result in the ambient light filter blocking visible red light from both ambient light and the reflected display light, resulting in a decreased intensity of reflected display light arriving at the image sensor, and that this is a tradeoff for reducing the effect of ambient light on the image captured at the image sensor. In other exemplary embodiments, the ambient light filter may be configured to block a different range of wavelengths—for example, blocking wavelengths of 590 nm or more or blocking wavelengths of 580 nm or more.

Figure 7C:
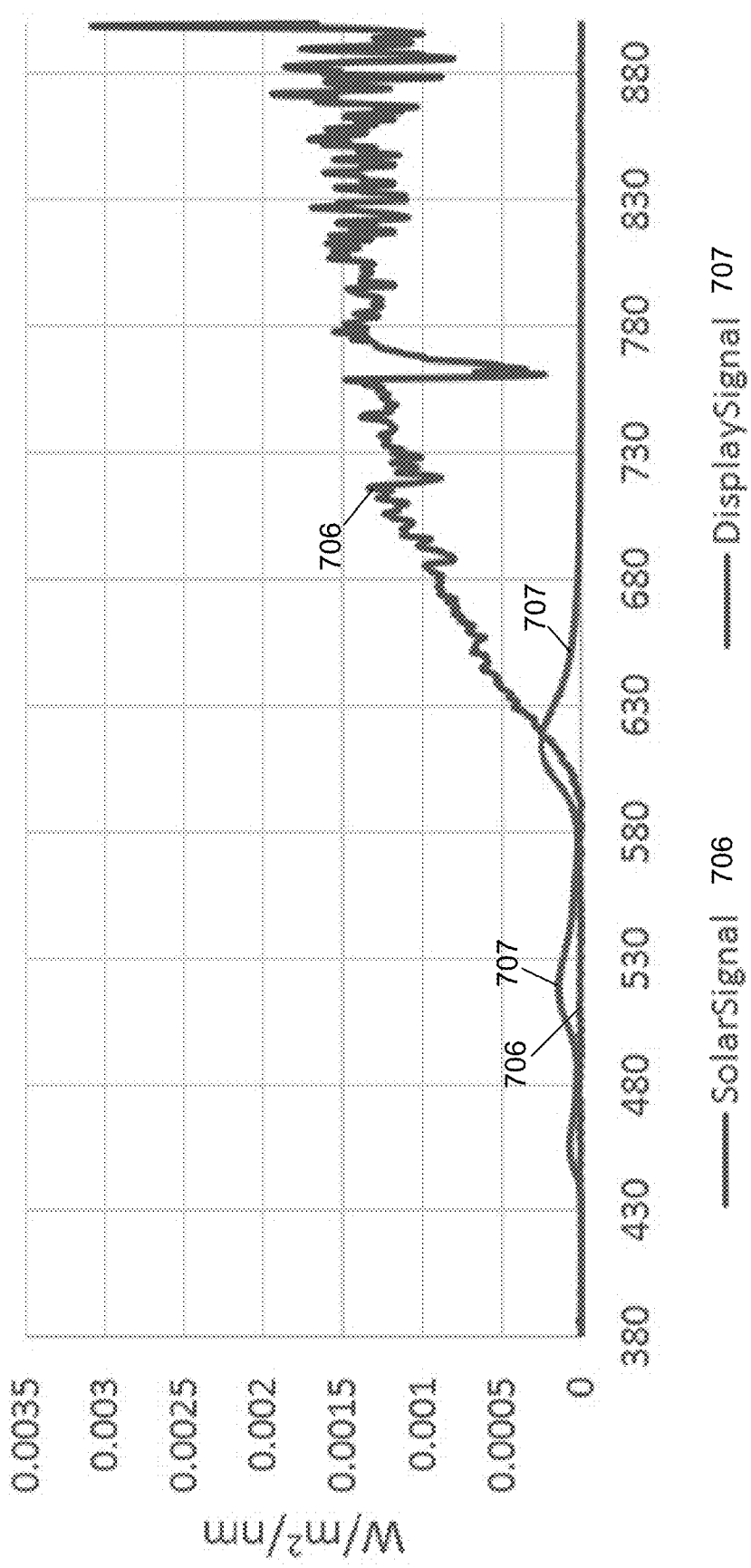

FIG. 7C is a plot depicting the intensity of display light reflected from a finger 707 and ambient light 706 across a spectrum of wavelengths (approximately 380-900 nm) that reaches a top of a collimator for an exemplary optical fingerprint sensor (neither the reflected display light nor the ambient light has passed through an ambient light filter at this point). As can be seen in FIG. 7C, the ambient light is largely attenuated by the finger at wavelengths smaller than 580-600 nm. As a result, the intensity of the reflected display light is higher than the intensity of ambient light that is transmitted through the finger at wavelengths smaller than approximately 580-600 nm.

Figure 7D:
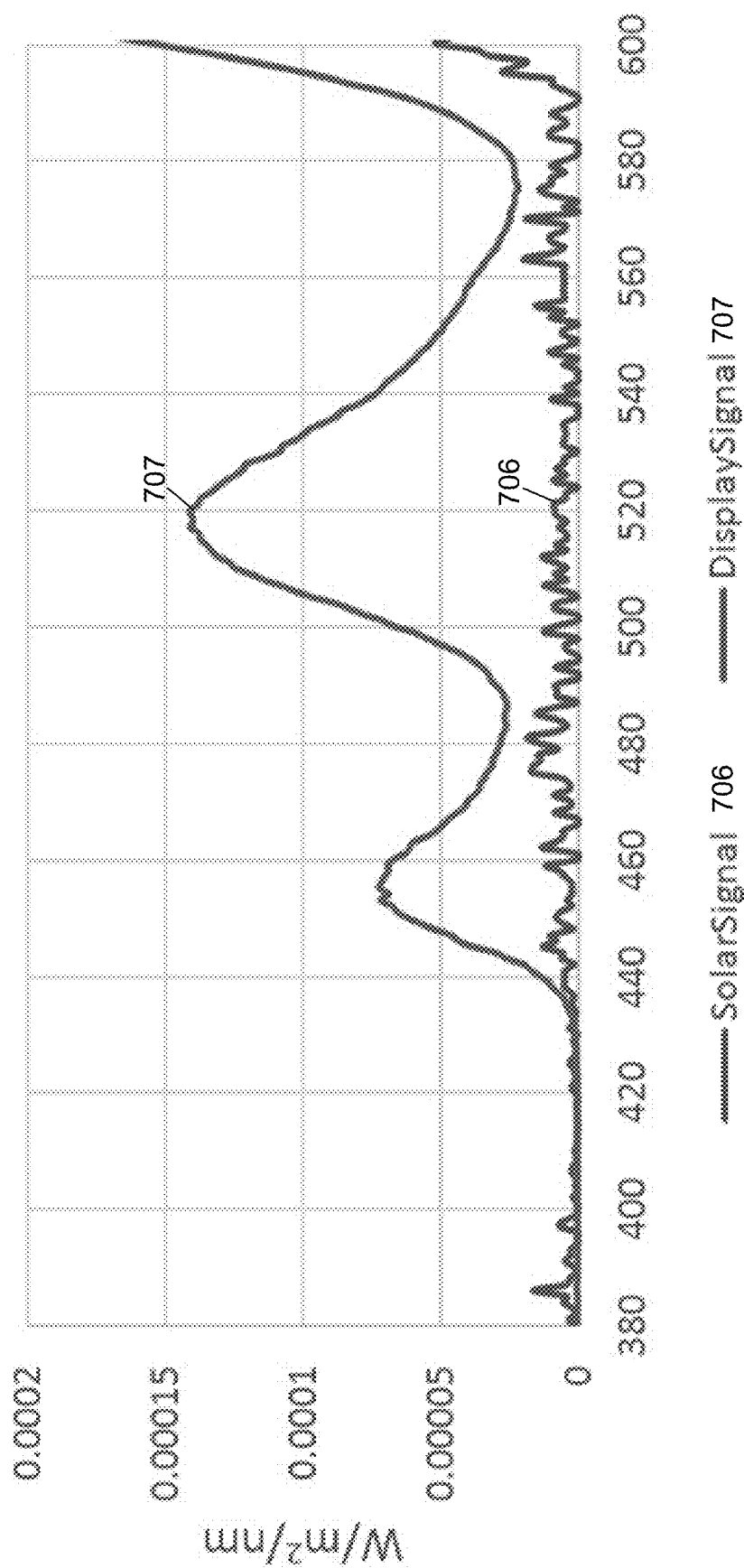

Therefore, by utilizing an ambient light filter which rejects wavelengths larger than ~580-600 nm, as discussed above according to exemplary embodiments, ambient light may be selectively rejected from reaching the collimator and/or the image sensor of the optical fingerprint sensor. FIG. 7D is a zoomed-in excerpt of the plot of FIG. 7C depicting the intensity of display light reflected from a finger 707 and ambient light 706 across the relatively lower portion of the spectrum of wavelengths of FIG. 7C (380-600 nm). As can be seen from FIG. 7D, by blocking wavelengths greater than 580-600 nm, the intensity of display light reflected from a finger 707 is dominant over the intensity of the ambient light 706.

It will be appreciated that, as can be seen from FIGS. 7A, 7C and 7D, there are peaks in the display light around wavelengths corresponding to red, green and blue light because the display has red, green and blue light sources. In exemplary embodiments where a light source other than a display is used to provide illumination for the optical sensor (e.g., in non-display devices or in display devices having an additional illumination source), the spectrum for the desired light reflected from the finger may be different.

It will further be appreciated that conventional, cost-effective optical image sensors, such as CMOS sensors, may be configured to detect light in the spectrum of approximately 400 nm to 900 nm. It is generally more cost-effective to provide an ambient light filter to block wavelengths of approximately 600 nm or more for a conventional optical image sensor rather than specifically designing an unconventional optical image sensor to only detect light in a spectrum below approximately 600 nm.

Additionally, in an exemplary embodiment, the optical image sensor may be a polysilicon or amorphous silicon or silicon carbide CMOS optical image sensor. In other exemplary embodiments, the optical image sensor may be a non-Si optical image sensor.

Figure 8A:
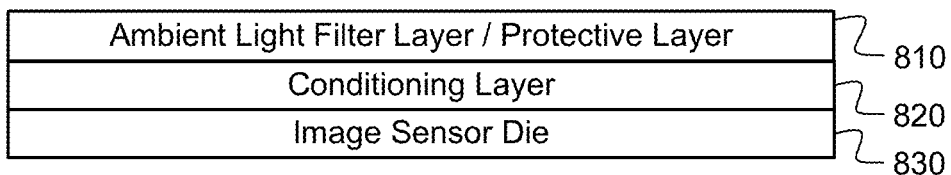
FIGS. 8A-8B are schematic diagrams depicting exemplary optical fingerprint sensors with an ambient light filter layer/protective layer according to exemplary embodiments.

An ambient light filter layer, whether separate from or integrated in a conditioning layer, may also be a protective layer which physically protects components or elements covered by the ambient light filter layer/protective layer. FIG. 8A is a schematic diagram depicting an exemplary optical fingerprint sensor with an ambient light filter layer/protective layer according to an exemplary embodiment. In this exemplary embodiment, a wafer-level process, which may be cost-effective, may be used to provide an ambient light filter layer/protective layer 810 which both: (1) protects the optical sensor components (e.g., collimating elements of the conditioning layer 820 and/or an image sensor die 830 disposed beneath the ambient light filter layer/protective layer 810) during downstream process/handling; and (2) provides an ambient light filter, which may include, for example, a spectral filter, a high pass filter, a low pass filter, an absorptive filter and/or an interference filter. The cost-effective wafer-level process may be integrated with respect to standard fabrication (front end) or packaging (back end) environments.

In certain exemplary embodiments, it will be appreciated that the ambient light filters discussed herein may be absorptive filters which utilize the addition of certain pigments and/or dyes to a layer of an optical sensor, such as an optically clear adhesive (OCA) or optically clear resin (OCR) layer, to tune the layer of the optical sensor to block a certain wavelength range. In certain exemplary embodiments, it will be appreciated that the ambient light filters discussed herein may be interference filters which are configured to reflect certain wavelengths while allowing other wavelengths to pass through. In certain exemplary embodiments, it may be advantageous to include both an absorptive ambient light filter and an interference ambient light filter to provide the ambient light filter for exemplary embodiments.

Figure 8B:
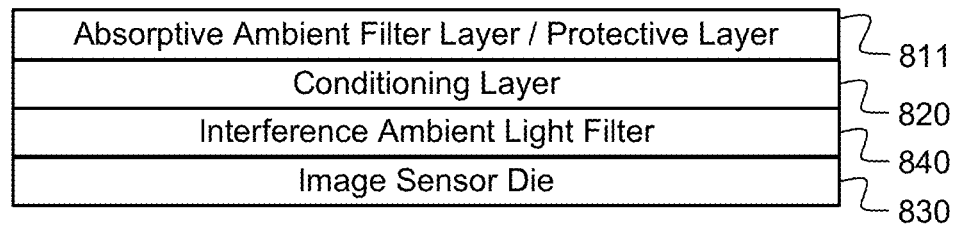

FIG. 8B is a schematic diagram depicting an exemplary optical fingerprint sensor with an absorptive ambient light filter/protective layer and a separate interference ambient light filter according to an exemplary embodiment. The interference ambient light filter 840 is disposed on a solid, hard surface of the image sensor die 830 and below the conditioning layer 820, while the absorptive ambient light filter is disposed above the collimating layer 820 as part of an absorptive ambient light filter layer/protective layer 811 (e.g., by laminating or spin-coating the absorptive ambient light filter material onto the conditioning layer 820). By having the absorptive ambient light filter disposed above the interference ambient light filter 840, unwanted reflected light may be blocked by the absorptive ambient light filter (so as to minimize visibility of the interference ambient light filter 840 to a user). Additionally, each of the two ambient light filters may be configured to provide filtering with respect to different ranges of wavelengths.

Incorporating a protective layer in an optical sensor device may be advantageous because sensor devices such as optical image sensors may utilize specialized or sensitive structures that allow the sensor to interact with the environment. Many of these sensors utilize fabrication techniques common to microelectromechanical systems (MEMS). These sensor structures (MEMS or otherwise) often present a problem in that open or unprotected features can present potential reliability or contamination issues during downstream processing or use. While hermetic or non-hermetic capping processes that form protective barriers around sensitive structures may sometimes be used, such processes may not be appropriate for all applications or may be too expensive. Exemplary embodiments disclosed herein utilize simplified processes for providing a protective layer which achieve a lower-cost alternative to conventional wafer capping processes. In addition, the processes allow incorporation of an ambient light filter into the protective layer.

Figure 9:
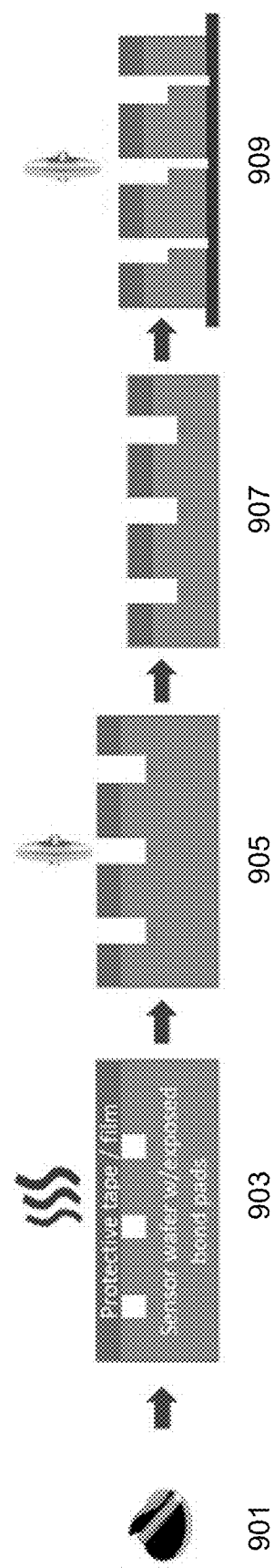
FIG. 9 is a schematic flowchart depicting an exemplary process for providing an ambient light filter layer/protective layer for an optical sensor device using a laminated protective film or tape.

FIG. 9 is a schematic flowchart depicting an exemplary process for providing an ambient light filter layer/protective layer for an optical sensor device using a laminated protective film or tape. At stage 901, a protective film or tape which comprises ambient light filter material (e.g., certain pigments and/or dyes) is laminated onto a wafer with exposed bond pads, for example, using Wafer Level Chip Scale Packaging (WLCSP) techniques for applying a laminated film on the backside of a wafer prior to laser marking and singulation, and/or using precision lamination equipment to provide void and ripple free films with good adhesion to Si or $SiO_2$. The wafer upon which the laminated film is applied may include both an image sensor and a conditioning layer, and the wafer may include a combination of a conditioning layer formed as a silicon wafer on top of an image sensor wafer. The same equipment and processing used for laminating a film onto a backside of a wafer may be adapted to laminate a film onto the front (or active) side of the wafer in accordance with the process depicted in FIG. 9.

At stage 903, the protective film or tape is cured so as to provide a dimensionally-stable coating after curing. The protective film or tape protects the silicon of the wafer from chipping during singulation and downstream handling (e.g., testing and surface mounting). The singulation includes singulation steps to expose wire bonding pads and/or to separate individual dies. For example, as depicted in FIG. 9, at stage 905, a half cutting operation is performed with respect to the wafer with the attached and cured protective film or tape to expose the bond pads on a top side of the image sensor; then, at stage 907, a backgrinding operation is performed to decrease the thickness of the wafer; and, at stage 909, a tape mounting and singulating operation is performed to singulate individual sensor dies and mount them on a tape.

In an exemplary embodiment, the protective film or tape laminated onto the front side of the wafer in stage 901 provides an ambient light filter (in addition to protecting the silicon of the wafer from chipping during the fabrication process). The end result of the process shown in FIG. 9 may include an ambient light filter/protective layer disposed over a light conditioning layer, with the light conditioning layer disposed over an image sensor layer (for example, as depicted with respect to the bottom portion of FIG. 2B).

The exemplary process depicted in FIG. 9 may be performed in a controlled atmosphere (e.g., $N_2$, Ar gas) such that cavities formed by the processing contain low moisture and low oxygen. Further, the exemplary process may be performed in a low particle count clean room to minimize exposure to downstream contamination. The thin film/tape process depicted in FIG. 9 is advantageous in that the surface protection and ambient light layer may be achieved at relatively low process temperatures (e.g., <150° C.), so as to avoid negative effects on sensitive sensor structures.

Figure 10:
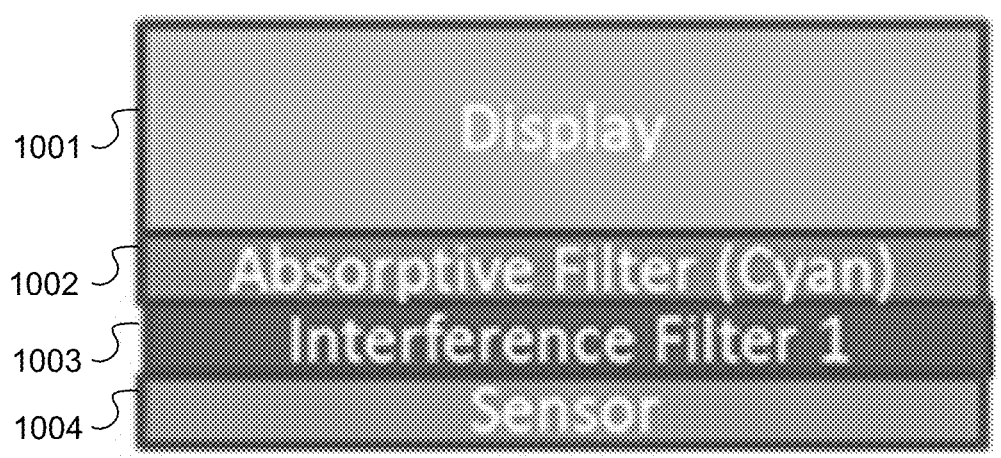
FIG. 10 is a schematic diagram depicting an exemplary ambient filter construction according to an exemplary embodiment.
Figure 11A:
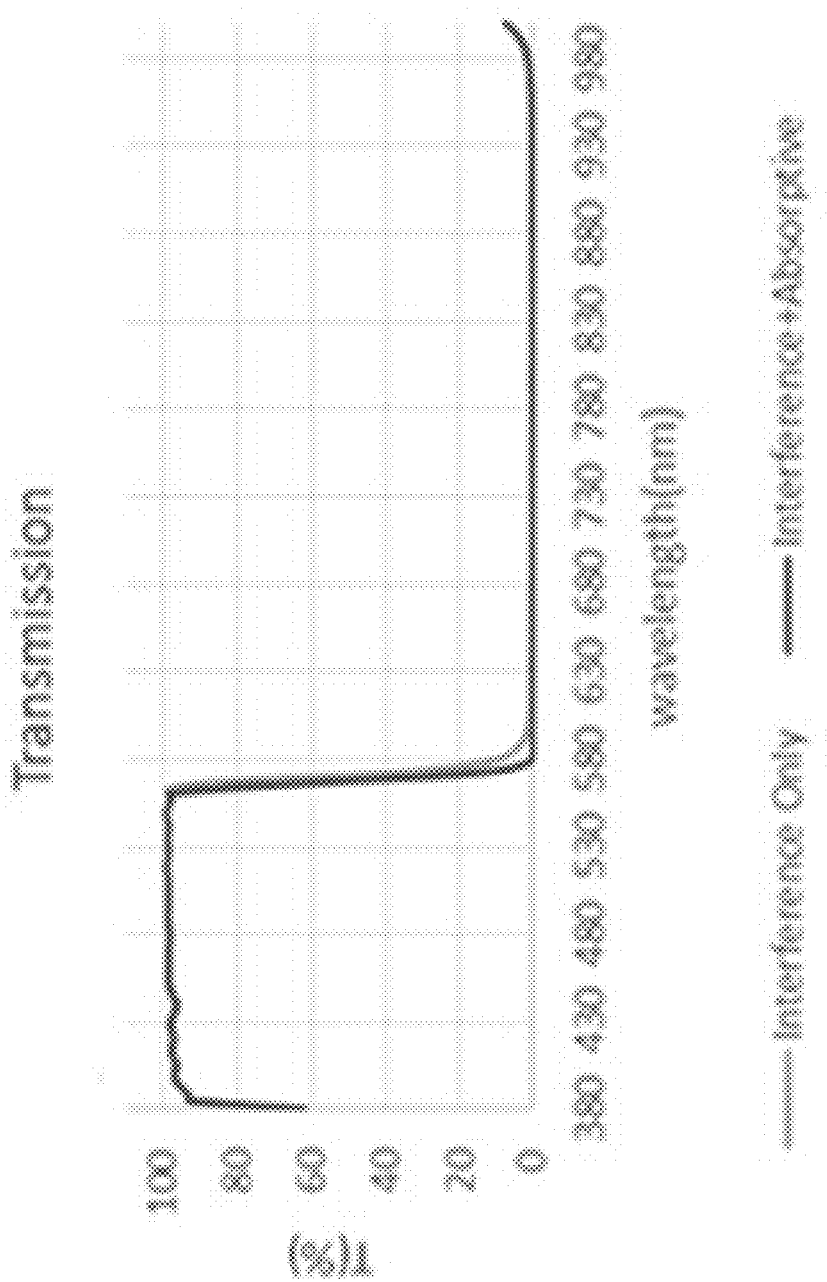
FIG. 11A depicts a plot showing transmission characteristics of a device that has only the interference filter versus a device that has both the interference filter and the absorptive filter.
Figure 11B:
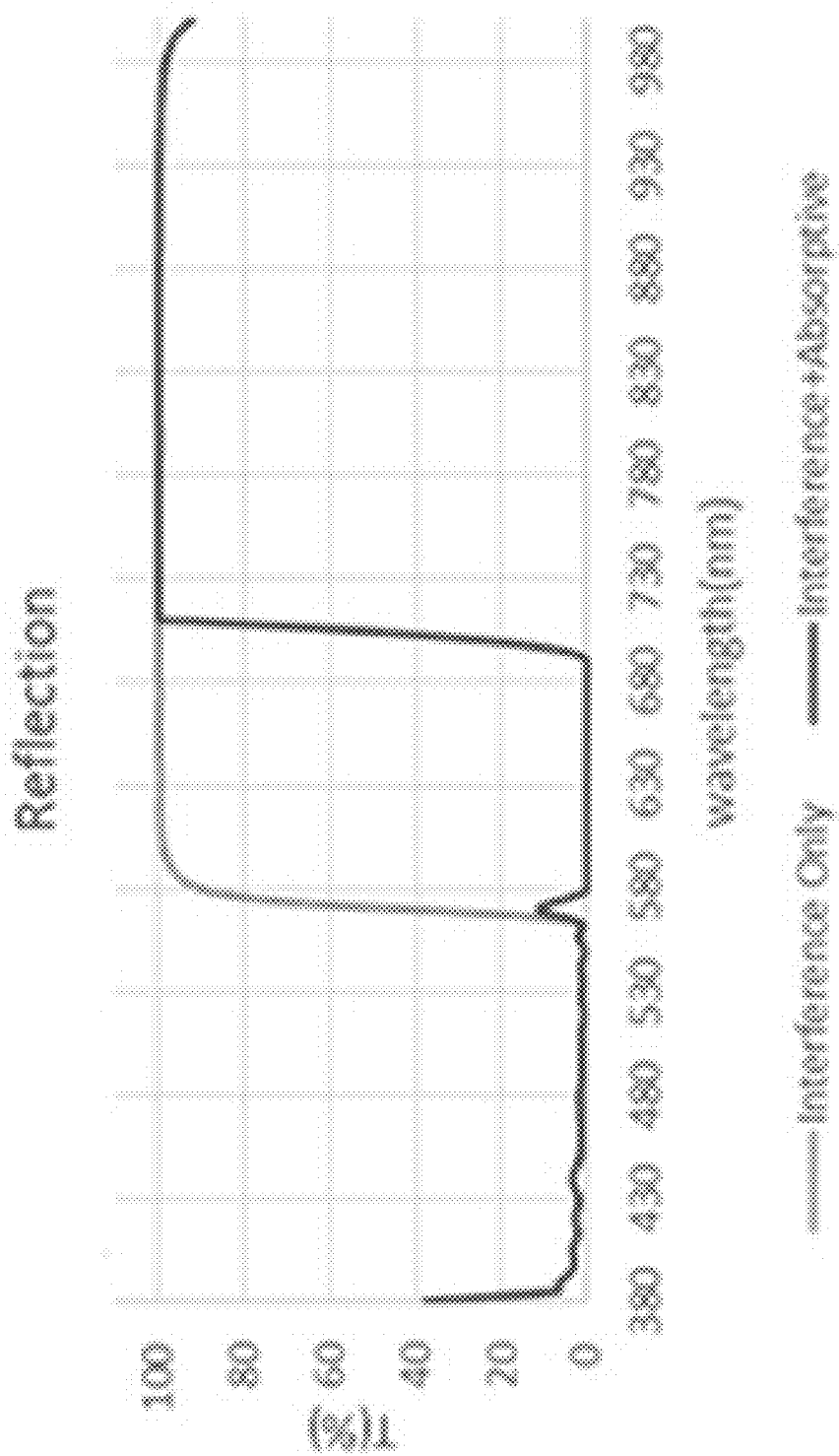
FIG. 11B depicts a plot showing reflection characteristics of a device that has only the interference filter versus a device that has both the interference filter and the absorptive filter

As discussed above in connection with FIG. 4, an absorptive filter (e.g., which attenuates orange/red light) can be added above an interference filter to eliminate visible reflection from the interference filter. FIG. 10 is a schematic diagram depicting an example of a cyan absorptive filter 1002 being disposed above an interference filter 1003, which provides for mitigating or eliminating visible reflections without a substantial reduction in signal detected at the sensor (e.g., no more than a 5-15% reduction). The cyan absorptive filter 1002 and the interference filter 1003 are between a display layer 1001 and a sensor layer 1004. FIG. 11A depicts a plot showing transmission characteristics of a device that has only the interference filter versus a device that has both the interference filter and the absorptive filter. As can be seen from FIG. 11A, both devices are able to filter out light having wavelengths above 580 nm. FIG. 11B depicts a plot showing reflection characteristics of a device that has only the interference filter versus a device that has both the interference filter and the absorptive filter. As can be seen from FIG. 11B, the device that has both the interference filter and the absorptive filter shows significant attenuation of red reflection.

The filter configuration shown in FIG. 10 having an absorptive filter above an interference filter may be implemented in a variety of ways. An interference filter layer may be directly deposited, and a cyan absorptive filter may be spun on (e.g., using spin-on techniques typically used for color CMOS sensors). This provides a thin solution with an overall thickness of a few microns. Alternatively, the filter assembly can be made separately and attached to the sensor or the display with the absorptive part being closest to the display. In an exemplary implementation with one interference filter layer, the absorptive filter can be coated on one side of the substrate and the interference filter layer is deposited on the other side of the substrate. The absorptive filter can also be part of the substrate itself or be part of an adhesive layer that attaches a filter assembly to the display (if one is used). In another exemplary implementation where an interference filter is split and deposited on both sides of a substrate to reduce stress, the absorptive filter can be coated directly above the two interference filters.

Figures 12A, 12B:
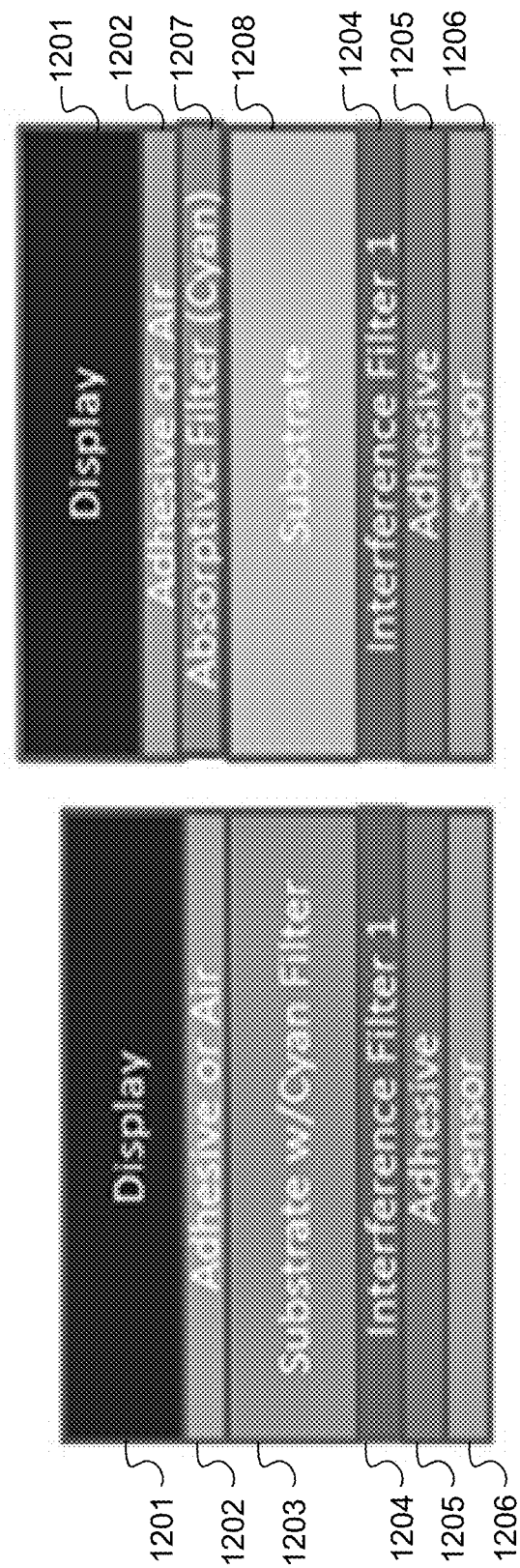
FIGS. 12A-12D are schematic diagrams depicting exemplary ambient filter constructions having an absorptive filter above an interference filter.
Figures 12C, 12D:
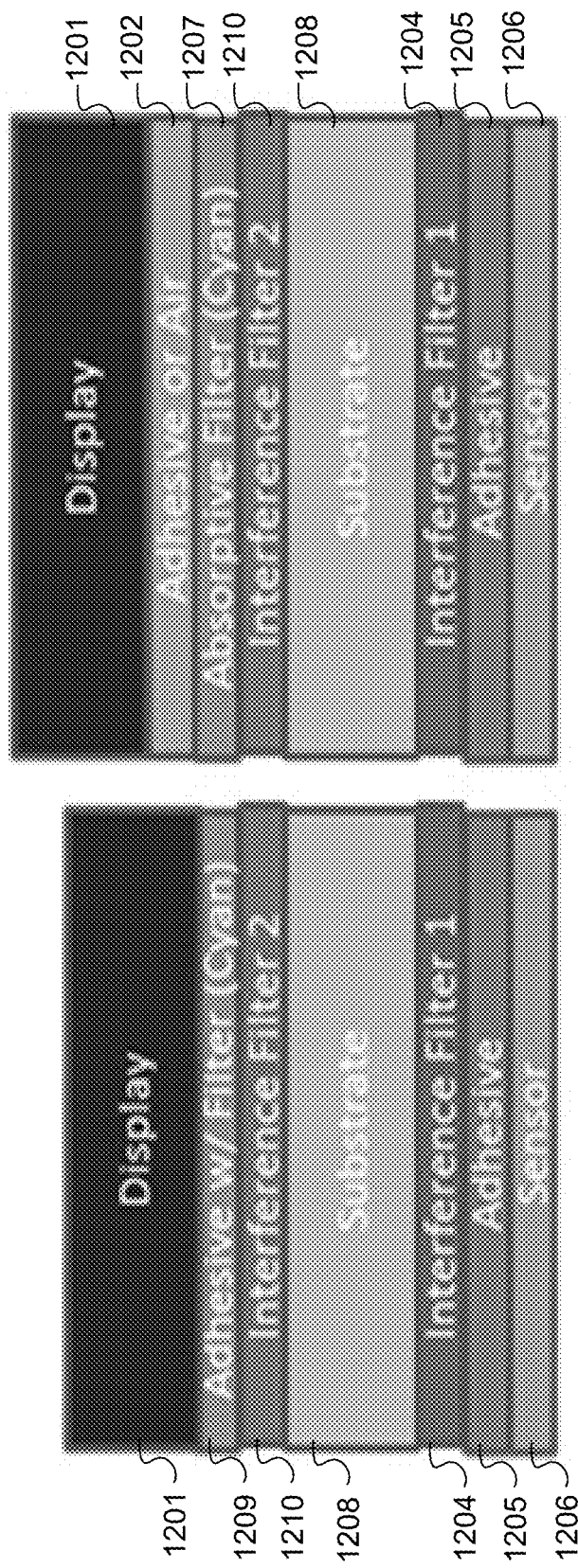

FIGS. 12A-12D are schematic diagrams depicting exemplary ambient filter constructions having an absorptive filter above an interference filter. In FIG. 12A, an absorptive cyan filter is part of the substrate 1203, and an interference filter 1204 is disposed on a bottom side of the substrate 1203. Above the filter assembly is a display layer 1201 and an adhesive or air layer 1202, and below the filter assembly is the sensor 1206 and an adhesive layer 1205. In FIG. 12B, an absorptive cyan filter 1207 is disposed on a top side of the substrate 1208, and an interference filter 1204 is disposed on a bottom side of the substrate 1208. Above the filter assembly is a display layer 1201 and an adhesive or air layer 1202, and below the filter assembly is the sensor 1206 and an adhesive layer 1205. In FIG. 12C, interference filters 1204, 1210 are disposed on both sides of a substrate 1208, and an absorptive cyan filter is part of an adhesive layer 1209 disposed between the display layer 1201 and the interference filter 1210 on the top side of the substrate 1208. Below the filter assembly is the sensor 1206 and an adhesive layer 1205. In FIG. 12D, interference filters 1204, 1210 are disposed on both sides of a substrate 1208, and an absorptive cyan filter 1207 is disposed above the interference filter 1210 on the top side of the substrate 1208. Above the filter assembly is a display layer 1201 and an adhesive or air layer 1202, and below the filter assembly is the sensor 1206 and an adhesive layer 1205.

Figure 13:
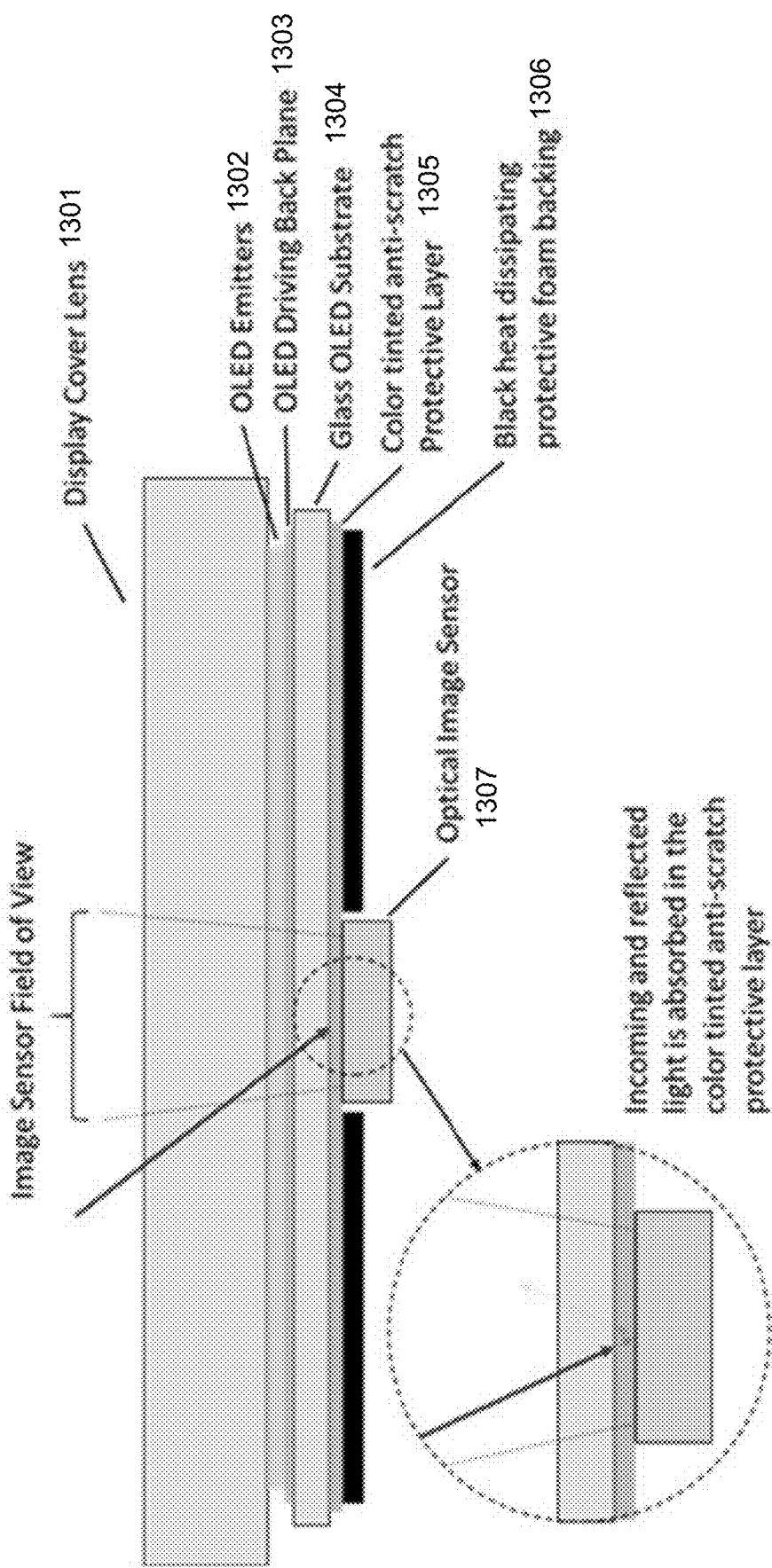
FIG. 13 is a schematic diagram depicting an exemplary display device having an ambient light filter according to an exemplary embodiment.

FIG. 13 is a schematic diagram depicting an exemplary display device having an ambient light filter according to an exemplary embodiment. FIG. 13 shows a cross-section of a glass substrate based OLED panel with a color tinted anti-scratch protective layer 1305 on a bottom side of the glass OLED substrate 1304. The glass substrate based OLED panel further includes display cover lens 1301, OLED emitters 1302, OLED driving back plane 1303, black heat dissipating protective foam backing 1306, and optical image sensor 1307. For OLED displays that are fabricated on thin (~200 um) glass substrates, such as those used in mobile device applications, an anti-scratch protective coating is commonly applied to the bottom side of the OLED substrate. This coating protects the fragile glass substrate from getting scratched during handling in the display fabrication process. This may be helpful because the critical flaw size for glass materials decreases with material thickness, i.e., a fine scratch on a 200 um thick glass wafer can propagate more easily than on a much thicker glass sheet.

The anti-scratch protective material should be hard and tough, so as to resist scratching itself and to absorb mechanical energy when impacted. It should also be easy to apply, relatively thin, have good adhesion to glass, and be relatively inexpensive. Polymer materials are examples of such anti-scratch protective material.

A pigment or soluble dye can be added to the anti-scratch layer to reduce reflections from the sensor or an interference filter. Any suitable dyes and pigments compatible with polymers may be used (e.g., a blue/cyan color filter from Roscolux), or multiple different dyes can be mixed together to provide for absorption of the appropriate wavelength(s) reflected from the sensor or the interference filter. If the anti-scratch layer on the back to OLED substrate is tinted with a cyan dye or pigment, then any red light that is illuminating the sensor as well as reflected from the sensor can be significantly absorbed (see FIG. 13), thereby reducing the appearance of the sensor under the display. The display substrate area around the sensor can be coated with a black foam material that is typically applied to the back of the display. In this way the cyan tinted anti-scratch layer will not be visible or affect the color purity of the rest of the display.

The color tinted anti-scratch protective layer may be applied (e.g. by spray, screen, or slot die coating) to the glass OLED substrate as a solution that is dried or cured. It may alternatively be produced as separate film that is subsequently adhered to the OLED substrate with an adhesive. The dye or pigment may also be mixed into the adhesive.

Figure 14:
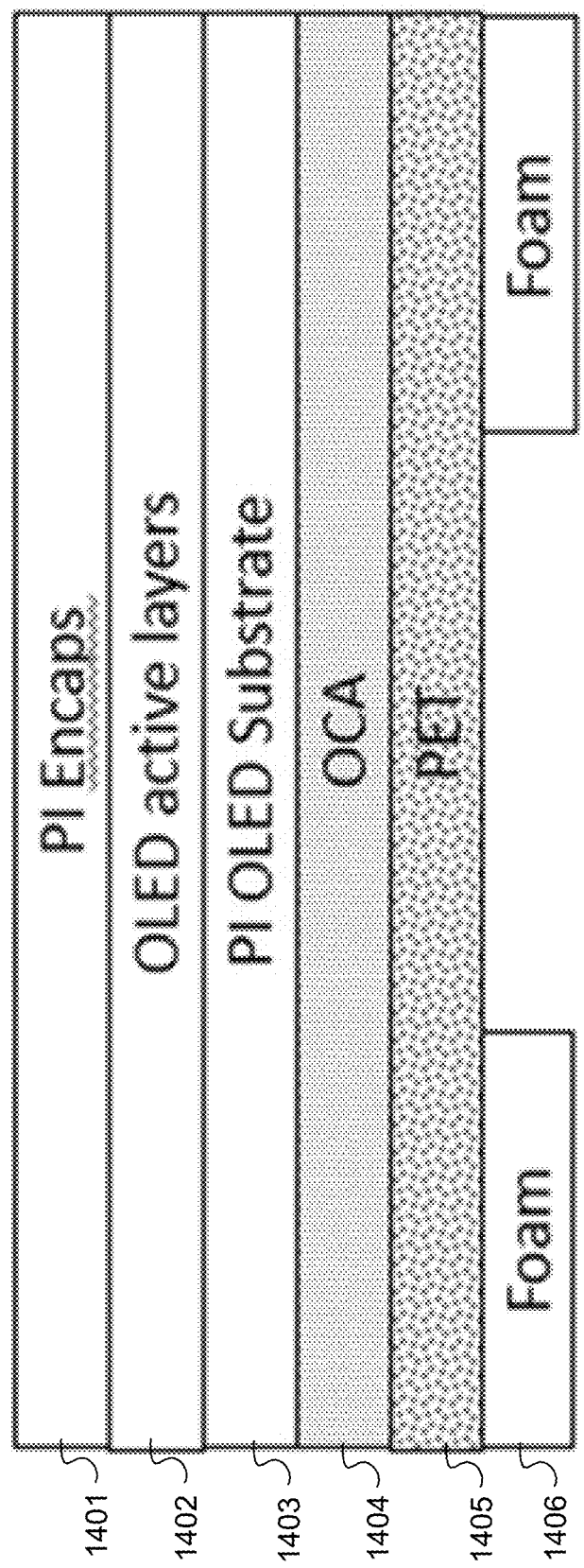
FIG. 14 is a schematic diagram depicting an exemplary display device having an ambient light filter according to an exemplary embodiment.

FIG. 14 shows another exemplary embodiment. On the back of the OLED display (which includes PI Encaps 1401 (a relatively thin polyimide encapsulation layer), OLED active layers 1402, and a PI OLED substrate 1403 (a flexible polyimide substrate on which OLED circuitry and other display components are built on)), there may be multiple layers in the protective film. For example, the protection film may include an adhesive (OCA 1404), a carrier film (polyethylene terephthalate or "PET" 1405), and a shock-absorbing foam 1406. The foam may be removed in the optical sensing area as it is not transparent. The adhesive and/or carrier film may be modified to include a pigment or dye that absorbs unwanted light. The pigment or dye may also be additionally or alternatively be added to the optically clear adhesive (OCA) shown in FIG. 14.

In another exemplary embodiment, an ambient light filter layer may be further configured to provide a different spectral response for different image sensor pixels of the optical image sensor. An image sensor, for example, may have 3 sub-pixels, including red, green and blue sub-pixels. The red sub-pixel has a light filter that only transmits red light, so that the red sub-pixel is only sensitive to red light. Similarly, the green and blue pixels have light filters that only transmit green and blue light, respectively. With this arrangement, each image that is recorded has 3 separate channels: red, green, and blue. Integrating color sensing into an optical sensor may, for example, enable better matching and/or better anti-spoofing performance. Thus, in this exemplary embodiment, color filters are integrated with an ambient light filter layer such that different spectral responses are provided for different image sensor pixels, without increasing stack height and without increasing the number of coating process steps during manufacture.

Figure 15:
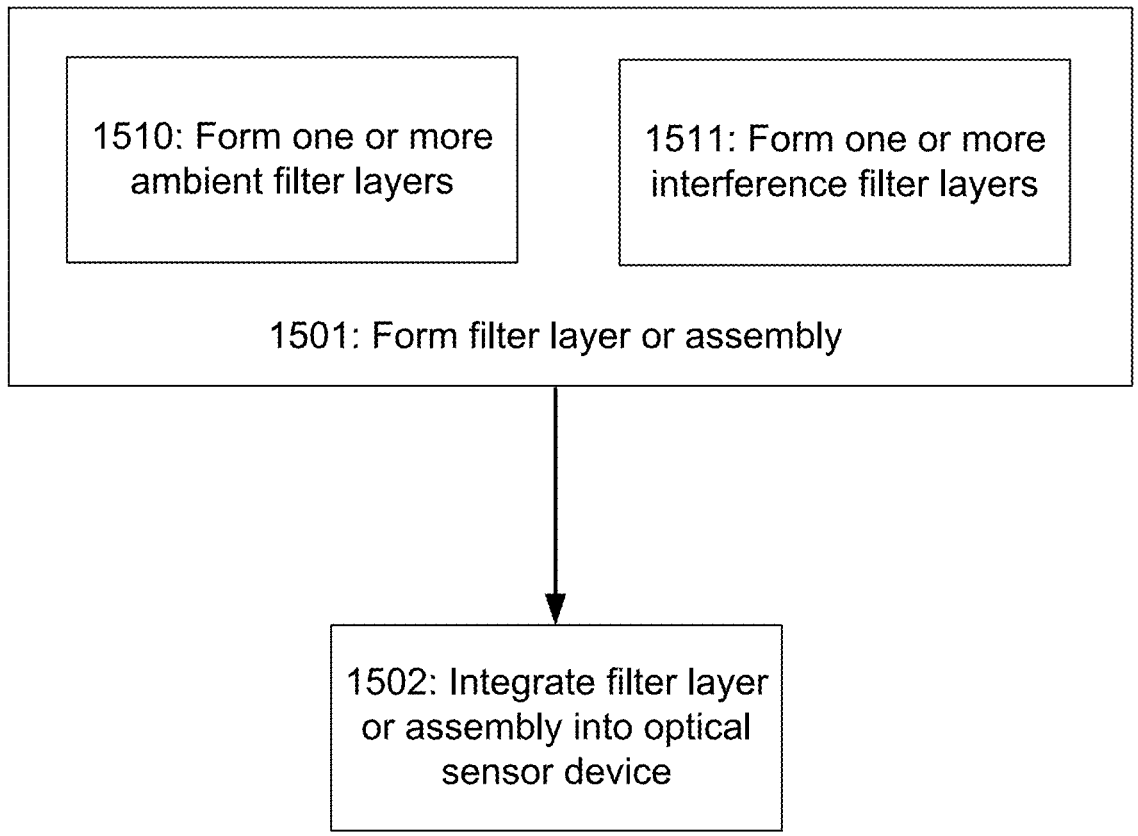
FIG. 15 is a flowchart depicting an exemplary process for forming an optical sensor device having an ambient light filter.

FIG. 15 is a flowchart depicting an exemplary process for forming an optical sensor device having an ambient light filter. At stage 1501, a filter layer or a filter assembly is formed. Forming the filter layer or the filter assembly may include forming one or more ambient filter layers at stage 1510 and/or forming one or more interference filter layers at 1511. For example, one or more absorptive filters and/or interference filters may be provided as standalone filter layers, may be integrated with light conditioning elements, may be integrated with a protective layer, and/or may be integrated with one or more adhesive layers as discussed above with respect to the foregoing exemplary embodiments. At stage 1502, the filter layer or the filter assembly is integrated into an optical sensor device as part of the manufacturing process for the optical sensor device. For example, the filter layers depicted and described above with respect to the foregoing exemplary embodiments may be formed through various attachment processes such as laminating or spin-coating, which may occur during the manufacture of a stack of component layers of an optical sensor device. In situations where multiple optical sensors are formed on a single wafer (e.g., as discussed above in connection with FIG. 9), a further step of dividing the sensor wafer into multiple respective optical sensors may additionally be performed.

It will be appreciated that although the examples discussed herein demonstrate certain exemplary implementations with respect to fingerprint sensors, these techniques may also be used in other embodiments for other types of sensors having different resolutions beyond just sensors configured to detect fingerprint patterns.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An optical sensor device, comprising:
   a display layer, comprising a light source configured to generate light incident on an input surface of the optical sensor device;
   an image sensor layer, disposed below the display layer, comprising an optical image sensor having a plurality of image sensor pixels; and
   a first ambient light filter layer, disposed between the display layer and the image sensor layer, configured to block one or more wavelengths of light,
   wherein the first ambient light filter layer is a hybrid optical and ambient filter layer, configured to block the one or more wavelengths of light and collimate light incident on the hybrid optical and ambient filter layer.

2. The optical sensor device according to claim 1, wherein the first ambient light filter layer is configured to block light having wavelengths of 580 nm or more.

3. The optical sensor device according to claim 1, wherein the first ambient light filter layer comprises an interference filter.

4. The optical sensor device according to claim 1, wherein the first ambient light filter layer is patterned with ambient light filtering regions corresponding to apertures in a conditioning layer and/or the plurality of image sensor pixels.

5. The optical sensor device according to claim 1, wherein the first ambient light filter layer comprises an absorptive filter; and
   wherein the optical sensor device further comprises:
   a second ambient light filter layer, disposed between the display layer and the image sensor layer, wherein the second ambient light filter layer comprises an interference filter.

6. The optical sensor device according to claim 5, wherein the first ambient light filter layer is disposed above the second ambient light filter layer.

7. The optical sensor device according to claim 1, wherein the first ambient light filter layer is configured to provide a different spectral response for different image sensor pixels of the optical image sensor.

8. The optical sensor device according to claim 1, wherein the hybrid optical and ambient filter layer comprises collimating elements in a multilayer configuration, with one or more layers of the multilayer configuration comprising ambient light filter material.

9. The optical sensor device according to claim 1, wherein the hybrid optical and ambient filter layer comprises a fiber core surrounded by an absorptive material, wherein the fiber core includes a color filter.

10. The optical sensor device according to claim 1, further comprising:
    an optical layer, disposed between the first ambient light filter layer and the image sensor layer, configured to collimate light incident on the optical layer.

11. The optical sensor device according to claim 1, further comprising:
    an optical layer, configured to collimate light incident on a conditioning layer;
    wherein the first ambient light filter layer comprises an interference filter, and the first ambient light filter layer is disposed between the conditioning layer and the image sensor layer.

12. The optical sensor device according to claim 11, wherein the image sensor layer comprises a mask on an upper surface of the image sensor layer.

13. The optical sensor device according to claim 1, wherein the first ambient light filter layer is formed in a layer of protective tape or film, configured to protect components of the optical sensor device during manufacturing.

14. The optical sensor device according to claim 1, wherein the first ambient light filter layer is formed in one or more adhesive layers of the optical sensor device.

15. An optical sensor system, comprising:
an optical sensor, comprising:
- a display layer, comprising a light source configured to generate light incident on an input surface of the optical sensor device;
- an image sensor layer, disposed below the display layer, comprising an optical image sensor having a plurality of image sensor pixels; and
- a first ambient light filter layer, disposed between the display layer and the image sensor layer, configured to block one or more wavelengths of light; and
a processing system, configured to image a biometric input at a sensing region of the optical sensor based on light detected by the optical image sensor,
wherein the first ambient light filter layer is a hybrid optical and ambient filter layer, configured to block the one or more wavelengths of light and collimate light incident on the hybrid optical and ambient filter layer.

16. A process for providing optical sensors, the process comprising:
providing a protective layer, wherein the protective layer comprises ambient light filter material;
attaching the protective layer to a sensor wafer; and
dividing the sensor wafer into multiple respective optical sensors,
wherein the ambient light filter material is a hybrid optical and ambient filter layer, configured to block one or more wavelengths of light and collimate light incident on the sensor wafer.

17. The process according to claim 16, wherein the sensor wafer comprises exposed circuitry, and attaching the protective layer to the sensor wafer covers the exposed circuitry using the protective layer.

18. The process according to claim 17, wherein the exposed circuitry comprises bond pads corresponding to the multiple respective optical sensors.

19. The process according to claim 17, wherein the sensor wafer comprises a light conditioning layer and an image sensor layer.

* * * * *